(12) United States Patent
Oga

(10) Patent No.: US 8,311,077 B2
(45) Date of Patent: Nov. 13, 2012

(54) MODULATOR, FILTER, METHOD OF CONTROLLING GAIN OF FILTER, AND CODE MODULATING METHOD

(75) Inventor: Toshiyuki Oga, Tokyo (JP)

(73) Assignee: NEC Corporation, Tokyo (JP)

( * ) Notice: Subject to any disclaimer, the term of this patent is extended or adjusted under 35 U.S.C. 154(b) by 769 days.

(21) Appl. No.: 12/088,566

(22) PCT Filed: Sep. 13, 2006

(86) PCT No.: PCT/JP2006/318123
§ 371 (c)(1),
(2), (4) Date: Mar. 28, 2008

(87) PCT Pub. No.: WO2007/037124
PCT Pub. Date: Apr. 5, 2007

(65) Prior Publication Data
US 2009/0135920 A1    May 28, 2009

(30) Foreign Application Priority Data
Sep. 28, 2005   (JP) .................................. 2005-281893

(51) Int. Cl.
*H04B 14/04*    (2006.01)
(52) U.S. Cl. ......................................... 375/146; 375/140
(58) Field of Classification Search .................. 375/130, 375/140, 146, 295, 296, 350, 229, 230; 370/320; 708/300
See application file for complete search history.

(56) References Cited

U.S. PATENT DOCUMENTS

| | | | |
|---|---|---|---|
| 4,316,258 A * | 2/1982 | Berger | 708/3 |
| 5,825,809 A * | 10/1998 | Sim | 375/350 |
| 6,134,569 A * | 10/2000 | Kot | 708/3 |
| 6,816,542 B1 * | 11/2004 | Komatsu | 375/148 |
| 7,443,906 B1 * | 10/2008 | Bang et al. | 375/140 |
| 2002/0075943 A1 * | 6/2002 | Kurihara | 375/146 |
| 2002/0176481 A1 * | 11/2002 | Shiina et al. | 375/130 |
| 2005/0089086 A1 * | 4/2005 | Hwang et al. | 375/148 |
| 2005/0152265 A1 * | 7/2005 | Denk | 370/209 |
| 2006/0002286 A1 * | 1/2006 | Sagisaka et al. | 370/203 |
| 2006/0215737 A1 * | 9/2006 | Bang et al. | 375/146 |

FOREIGN PATENT DOCUMENTS

| | | |
|---|---|---|
| JP | 2001156679 A | 6/2001 |
| JP | 2001285252 A | 10/2001 |
| JP | 2001339365 A | 12/2001 |
| JP | 2006020214 A | 1/2006 |
| WO | 0176114 A1 | 10/2001 |

OTHER PUBLICATIONS

International Search Report for PCT/JP2006/318123 mailed Oct. 10, 2006.

* cited by examiner

*Primary Examiner* — Aristocratis Fotakis

(57) ABSTRACT

A modulator being made small in size, low in costs, low in power consumption, small in heat generation and spurious signals. The modulator includes multipliers (101, 102) for code-modulating received transmission data (D(n), C(n)), and outputting the modulated data, a control channel gain factor signal generator (106) for generating a gain control signal, a control channel gain factor signal generator (107), and weighting coefficient setting signal generators (108, 109) for receiving the output of the complex-number computing section (120) and controlling the gains of the raised cosine filters (110 to 113).

13 Claims, 9 Drawing Sheets

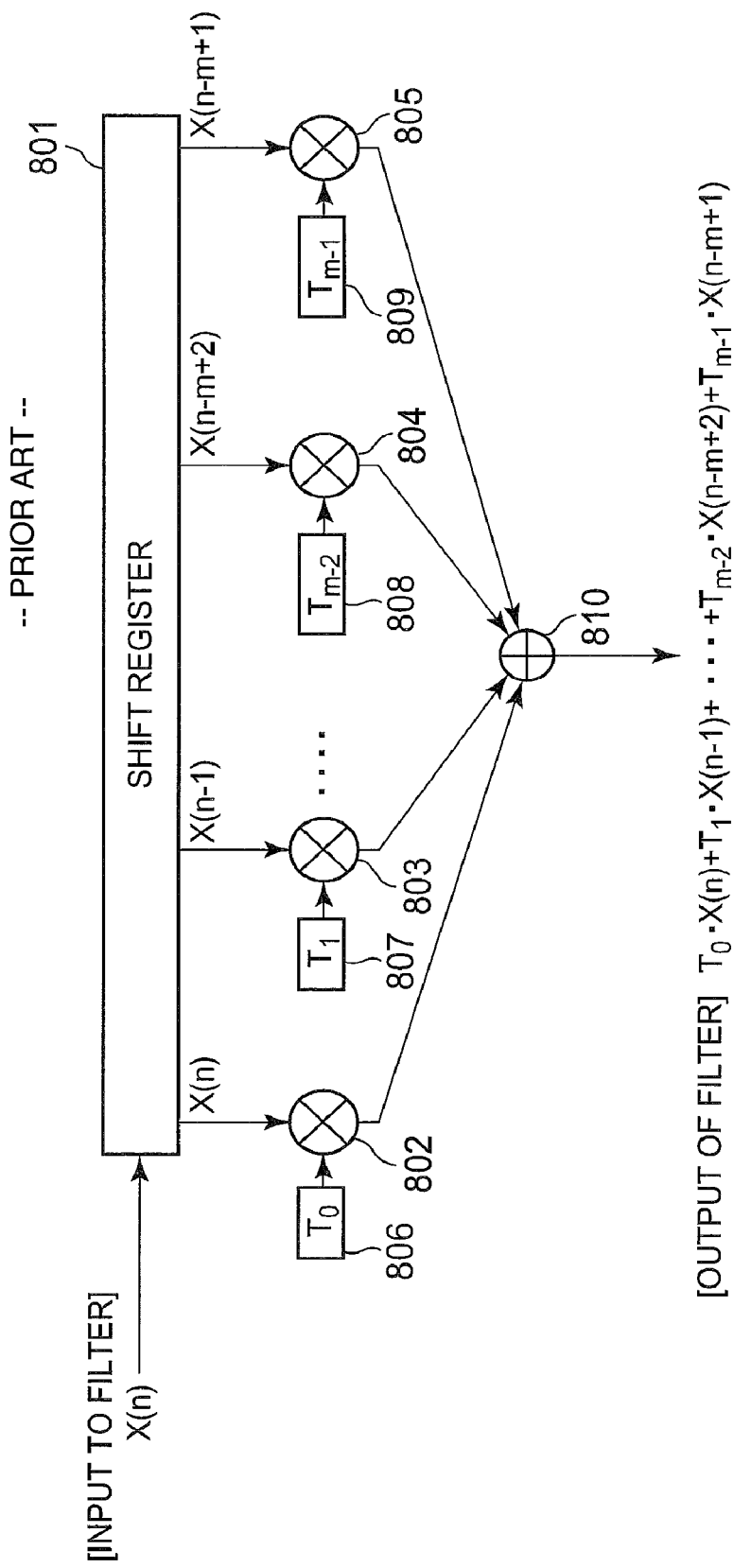
FIG. 8 -- PRIOR ART --

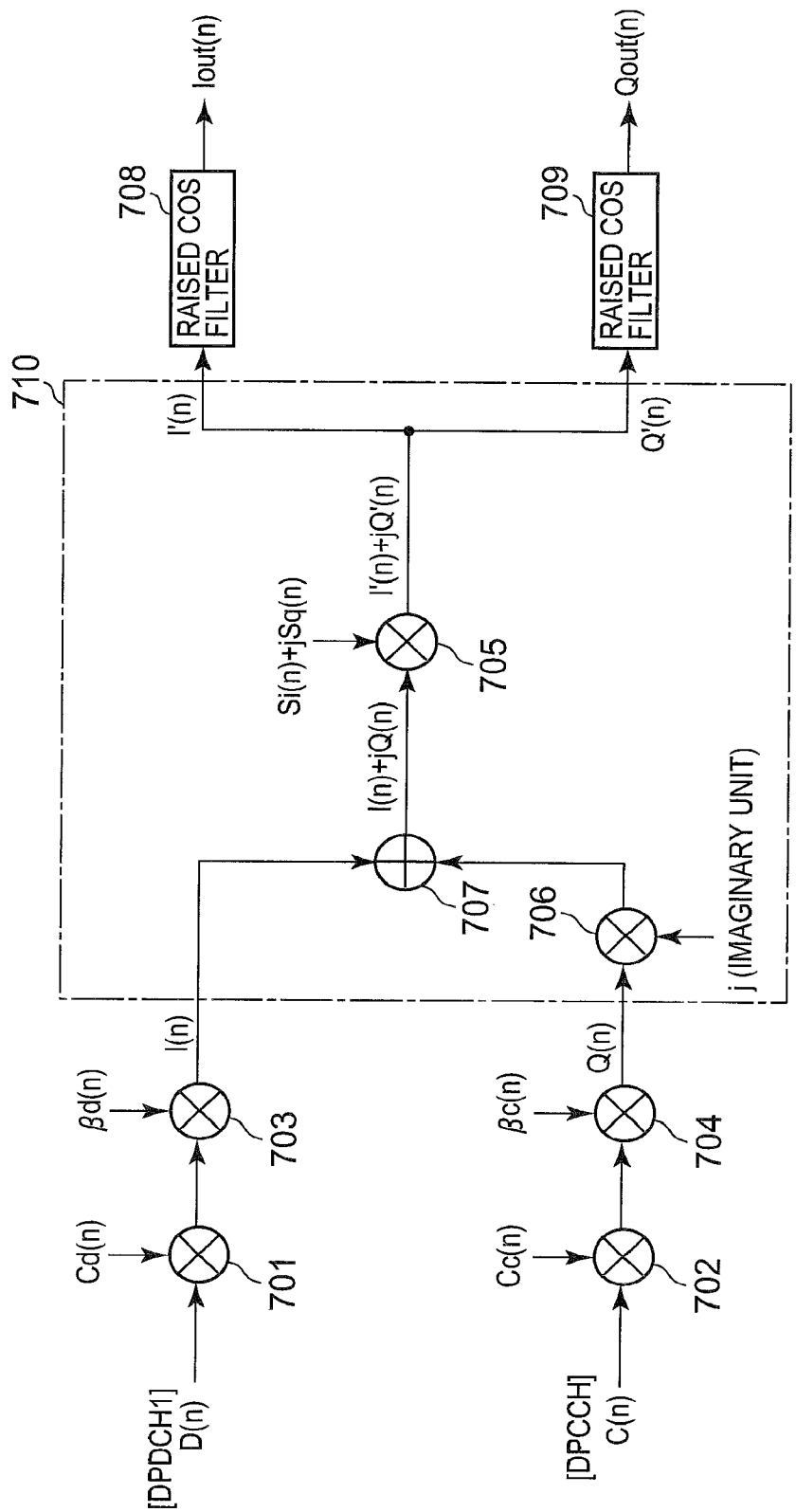
FIG. 9 -- PRIOR ART --

MODULATOR, FILTER, METHOD OF CONTROLLING GAIN OF FILTER, AND CODE MODULATING METHOD

TECHNICAL FIELD

The present invention relates to a modulator, filter, method of controlling a gain of a filter, and a code modulating method and more particularly to the digital modulator for use in wireless communication or a like whose amplitude level can be set for every channel multiplexed through encoding and to the filter included in the modulator, the method of controlling a gain of a filter, and the code modulating method.

BACKGROUND TECHNOLOGY

In a communication system using a W-CDMA (Wideband Code Division Multiple Access) communication method, at the time of communication through an uplink from a mobile station to a base station, an HPSK (Hybrid Phase Shift Keying) modulator is employed to achieve modulation of signals.

One example of configurations of the HPSK modulator is shown in FIG. 7. The HPSK modulator is set forth in Technical Specification 3GPP ($3^{rd}$ Generation Partnership Project) TS 25.213 of 3GPP being a standard specification of mobile communication system.

In FIG. 7, data to be transmitted via a plurality of signal channels are shown as each of DPDCH1 (Dedicated Physical Data Channel 1) data to DPDCH6 data, DPCCH (Dedicated Physical Control Channel) data, and HS-DPCCH (High Speed DPCCH) data. Each piece of data is one-bit time-series data. The modulator is provided with a plurality of multipliers 901 to 908 and a plurality of multipliers 910 to 917 and each of the plurality of multipliers 901 to 908 and of multipliers 910 to 917 corresponds to each of the channels. Each piece of the data DPDCH1 to data DPDCH6, data DPCCH, and data HS-DPCCH is multiplied, for channel multiplexing, by each of channelization codes Cd1 to Cd6, Cc, and Chs each being one-bit time-series data to be used for channel identification in each of the multipliers 901 to 908. Next, in each of the multipliers 910 to 917, each piece of the data DPDCH1 to data DPDCH6, data DPCCH, and data HS-DPCCH is multiplied, for level setting to every channel, by each of gain factors βd1 to βd6, βc, and βhs. Each of the gain factors βd1 to βd6, βc, and βhs is time-series data consisting of a plurality of bits in width. Therefore, each of outputs from the multipliers 910 to 917 is also time-series data consisting of a plurality of bits in width.

In the examples in FIG. 7, the outputs from the multipliers 910 to 917 are grouped into data for an in-phase channel and data for an orthogonal channel and each of the outputs from the multipliers 910 to 913 is inputted, as a real number, to an in-phase channel adder 919 for adding operations and each of the outputs from the multipliers 914 to 917 is inputted, as a real number, to an orthogonal channel adder 920 for adding operations. A real number output I from the in-phase channel adder 919 and a real number output Q from the orthogonal channel adder 920 are inputted to a complex-number computing section 930. The complex-number computing section 930 includes a complex-number multiplier 921, a complex-number multiplier 922, and a complex-number adder 923.

In the complex-number computing section 930, the output Q from the orthogonal channel adder 920 is multiplied by an imaginary unit "j" in the complex-number multiplier 922 and then the product is added to the output I from the in-phase channel adder 919 in the complex-number adder 923 and, thereafter, the output is handled as a complex-number signal (I+jQ). The complex-number signal (I+jQ) is multiplied by a scramble code (Si+jSq) being specific to a mobile station for identification of the mobile station in the complex-number multiplier 921 and, as a result, a complex-number signal (I'+jQ') is generated. The scramble code (Si+jSq) is a complex number whose a real part is Si and whose coefficient of an imaginary part is Sq and each of the codes Si and Sq is one-bit time-series data. Its real part I' is separated from the coefficient Q' of its imaginary part and each is outputted, as a real number, from the complex-number computing section 930. After filtering is performed for restricting bandwidth and for providing roll-off characteristics on the complex-number signal (I'+jQ') in each of raised-cosine filters 924 and 925 (hereinafter, in drawings, referred simply to as a "raised COS filter"), signals Iout and Qout are outputted therefrom.

An example of configurations of the raised cosine filter is showed in FIG. 8. As the raised cosine filter, in general, a FIR (Finite Impulse Response) filter is used.

The raised cosine filter is configured to impose restrictions on a transmitting frequency bandwidth by providing an input signal generally having a rectangular waveform with route roll-off characteristics, without causing intersymbol interference to a received demodulated signal, and to make up a matched filter together with filters mounted on a receiver side.

Hereinafter, in drawings, a symbol X(n) denotes n-th data in a data string X. A symbol "n" (integer number) denotes a time-series string and data having the larger "n" represents the later data in terms of time. In the W-CDMA communication method in particular, an oversampling operation is performed at a frequency obtained by multiplying a chip-rate frequency of 3.84 MHz used as a reference frequency by an integer and, here the "n" corresponds to discrete time.

As shown in FIG. 8, the raised cosine filter includes a shift register 801, a plurality of multipliers 802 to 805, a plurality of weighting coefficient generators 806 to 809 (in FIG. 8, shown as "T0", "T1", ..., "Tm−2", "Tm−1") and an adder 810.

The data X(n) is inputted to an m-bit ("m" being an integer) shift register 801. At this time point, the shift register 801 simultaneously outputs data X(n), X(n−1), ..., X(n−m+2), X(n−m+1). The data X(n), X(n−1), ..., X(n−m+2), X(n−m+1) is input respectively to the multipliers 802 to 805 and is multiplied respectively by weighting coefficients T(0), T(1), ..., T(m−2), T(m−1) in the multipliers 802 to 805, and then is added in the adder 801 for being outputted. The weighting coefficients T(0), T(1), ..., T(m−2), T(m−1) are respectively generated by the weighting coefficient generators 806 to 809.

Time-series operations of the HPSK modulator are described by referring to FIGS. 8 and 9. Here, for simplification, cases are shown in which the in-phase channel group shown in FIG. 7 includes only the DPDCH1 channel and the orthogonal channel group shown in FIG. 7 includes only the DPCCH channel.

DPDCH1 channel data D(n) is multiplied by a channelization code Cd (n) in the multiplier 701 and the product is further multiplied by a gain factor β d(n) in the multiplier 703 and the product becomes in-phase input data I(n) of the complex-number computing section 710. The data I(n) is shown by the following equation (1).

$$I(n)=D(n)\cdot Cd(n)\cdot \beta d(n) \quad (1)$$

DPCCH channel data C(n) is multiplied by the channelization code Cc (n) in the multiplier 702 and the product is further multiplied by a gain factor β c(n) in the multiplier 704 and the product becomes orthogonal input data Q(n) of the complex-number computing section 710. The data Q(n) is shown by the following equation (2).

$$Q(n)=C(n)\cdot Cc(n)\cdot \beta c(n) \quad (2)$$

The complex-number computing section 710, when having fetched the in-phase data I(n) and orthogonal input data Q(n), first multiplies the orthogonal input data Q(n) by an imaginary unit "j" by the multiplier 706 and then adds the product to the in-phase input data I(n) in the adder 707 to generate complex-number data (I(n)+jQ(n)). Complex-number data (I(n)+jQ(n)) is multiplied by a scramble code {Si(n)+jSq(n)} being complex-number data in the multiplier 705 to generate complex-number data (I'(n)+jQ'(n)). The complex-number data {I'(n) +jQ'(n)} is shown by the following equation (3).

$$I'(n) + jQ'(n) = \{I(n) + jQ(n)\} \cdot \{Si(n) + jSq(n)\} = \\ \{I(n)\cdot Si(n) - Q(n)\cdot Sq(n)\} + j\{I(n)\cdot Sq(n) + Q(n)\cdot Si(n)\} \quad (3)$$

The complex-number computing section 710 outputs the real part I'(n) of the complex number data {I'(n)+jQ'(n)} and the imaginary coefficient Q'(n) as real number data to each of the raised cosine filters 708 and 709. Since a real part and an imaginary part are independent from each other, in order to make the equation (3) hold all the time, the I'(n) and Q'(n) have to be given as the following equations (4) and (5).

$$I'(n)=I(n)\cdot Si(n)-Q(n)\cdot Sq(n) \quad (4)$$

$$Q'(n)=I(n)\cdot Sq(n)+Q(n)\cdot Si(n) \quad (5)$$

By substituting the equations (1) and (2) into the equations (4) and (5) respectively and rearranging the equations, the following equations (6) and (7) can be obtained.

$$I'(n)=\{D(n)\cdot Cd(n)\cdot Si(n)\}\cdot \beta d(n)-\{C(n)\cdot Cc(n)\cdot Sq(n)\}\cdot \beta c(n) \quad (6)$$

$$Q'(n)=\{D(n)\cdot Cd(n)\cdot Sq(n)\}\cdot \beta d(n)+\{C(n)\cdot Cc(n)\cdot Si(n)\}\cdot \beta c(n) \quad (7)$$

When the raised cosine filters 708 and 709 are made up of the FIR filter having the number of taps of "m" and weighting coefficients T0, T1, ..., Tm−1, their outputs Iout(n) and Qout(n) are shown respectively by the following equations (8) and (9).

$$Iout(n)=T0\cdot I'(n)+T1\cdot I'(n-1)+\ldots+Tm-2\cdot I'(n-m+2)+Tm-1\cdot I'(n-m+1) \quad (8)$$

$$Qout(n)=T0\cdot Q'(n)+T1\cdot Q'(n-1)+\ldots+Tm-2\cdot Q'(n-m+2)+Tm-1\cdot Q'(n-m+1) \quad (9)$$

Each of the I'(n) and Q'(n) contains a gain factor as a factor of a product and, therefore, is data made up of a plurality of bits. Also, the weighting coefficient Tk (K=0, 1, ..., m−1) is data consisting of a plurality of bits. As a result, according to the equations (8) and (9), in the computation by each of the raised cosine filters, multiplications among data consisting of a plurality of bits occur by the number of taps.

By substituting the equations (6) and (7) into the equations (8) and (9) respectively and rearranging these equations, the following equations (10) and (11) can be obtained.

$$Iout(n)=T0\cdot\{\beta d(n)\cdot D(n)\cdot Cd(n)\cdot Si(n)-\beta c(n)\cdot C(n)\cdot Cc(n)\cdot Sq(n)\}+T1\cdot\{\beta d(n-1)\cdot D(n-1)\cdot Cd(n-1)\cdot Si(n-1)\}-\beta c(n-1)\cdot C(n-1)\cdot Cc(n-1)\cdot Sq(n-1)\}+\ldots+Tm-2\cdot\{\beta d(n-m+2)\cdot D(n-m+2)\cdot Cd(n-m+2)\cdot Si(n-m+2)-\beta c(n-m+2)\cdot C(n-m+2)\cdot Cc(n-m+2)\cdot Sq(n-m+2)\}+Tm-1\cdot\{\beta d(n-m+1)\cdot D(n-m+1)\cdot Cd(n-m+1)\cdot Si(n-m+1)-\beta c(n-m+1)\cdot C(n-m+1)\cdot Cc(n-m+1)\cdot Sq(n-m+1)\} \quad (10)$$

$$Qout(n)=T0\cdot\{\beta d(n)\cdot D(n)\cdot Cd(n)\cdot Sq(n)+\beta c(n)\cdot C(n)\cdot Cc(n)\cdot Si(n)\}+T1\cdot\{\beta d(n-1)\cdot D(n-1)\cdot Cd(n-1)\cdot Sq(n-1)\}+\beta c(n-1)\cdot C(n-1)\cdot Cc(n-1)\cdot Si(n-1)+\ldots Tm-2\cdot\{\beta d(n-m+2)\cdot D(n-m+2)\cdot Cd(n-m+2)\cdot Sq(n-m+2)+\beta c(n-m+2)\cdot C(n-m+2)\cdot Cc(n-m+2)\cdot Si(n-m+2)\}+Tm-1\cdot\{\beta d(n-m+1)\cdot D(n-m+1)\cdot Cd(n-m+1)\cdot Sq(n-m+1)\}+\beta c(n-m+1)\cdot C(n-m+1)\cdot Cc(n-m+1)\cdot Si(n-m+1)\} \quad (11)$$

As a result, in the raised cosine filter described above, the multiplications among pluralities of bits occur the number of times being twice the product obtained by multiplying the number of taps of the FIR filter by a clock frequency (product of a chip-rate frequency and oversampling rate) per unit time, which causes an enormous amount of operations.

This presents problems in that a computing circuit becomes large in scale, causing difficulties in miniaturization and increased costs for a modulator. Also, power consumption to operate the circuit is increased, which causes an increase in heat generation. Another problems arise in that, when computing accuracy is to be made higher to improve signal quality, an amount of computation also increases, which makes the computing circuit further larger in scale and increases the consumption power, still further leading to difficulties in the improvement of signal quality.

Conventional technologies to solve the above problem are disclosed, for example, in Japanese Patent Application Laid-open Nos. 2001-339365 (Patent Reference 1) and 2001-156679 (Patent Reference 2). In the Patent References 1 and 2, technologies are disclosed which try to decrease an amount of computations by changing the sequence of computations through a contrivance.

Among data to be inputted for computations, data consisting of a plurality of bits are gain factors and weighting coefficients. Since inputted data other than that is one-bit data for which an exclusive OR circuit can be employed as a multiplier, the computing circuit can be made smaller in scale, thereby reducing power consumption. In the Patent References 1 and 2, the above problems are tried to be solved by shifting plural-bit multiplying computations toward the end of computing order.

DISCLOSURE OF THE INVENTION

Problems to be Solved by the Invention

However, the conventional modulators described in the above two Patent References are susceptible to further improvement. The technology described in the Patent Reference 2 has a problem in that, since a gain factor multiplying processing section is placed in a backward stage of a raised cosine filter, a change in a signal level in a step-like form occurring at a time of changing a gain factor is not filtered by a raised cosine filter and, as a result, a signal spectrum spreads causing spurious signals to be generated in an adjacent channel.

To prevent this problem, in the modulator disclosed in the Patent Reference 1, a contrivance is provided for performing a method of generating a gain factor. That is, also in the technology described in the Patent Reference 1, the multiplication of a gain factor is performed at a time later than when the raised cosine filter multiplication is done, however, the gain factor is supplied from an envelope generator in a manner to be changed in a ramp-like state, thereby enabling prevention of the occurrence of spurious signals.

However, the technology has another problem in that the envelope generator having a digital filter circuit is required to do the above multiplication, which causes an increase in circuit scale. Moreover, an envelope behavior appearing at a time of changing a gain factor is not obtained by a filter operation by the raised cosine filter and merely by performing approximation processing by which the envelope characteristics are changed from its step-like shape to its ramp-like shape. Therefore, the problem of the occurrence of spurious signals still remains basically unsolved.

In summary, the conventional modulators described in the above two Patent References are susceptible to further improvement. That is, the first point is that enormous amounts of computations cause the computing circuit to do the computation to be made larger in scale, thus making it difficult to miniaturize the modulator.

The second point is that enormous amounts of computations cause the computing circuit to do the computation to be made larger in scale, thus causing an increase in costs. The third point is that enormous amounts of computations cause the computing circuit to do the computation to be made larger in scale, thus causing an increase in power consumption. The fourth point is that enormous amounts of computations cause the computing circuit to do the computation to be made larger in scale which leads to the increase in power consumption, thus causing an increase in amounts of heat generation.

The fifth point is that the further increase in amounts of computations to raise computing accuracy is required, which results in presenting the above fourth problems and, therefore, it is impossible to improve signal quality by raising computing accuracy. The sixth point is that, if the gain factor multiplying section is placed at a backward stage of the raised cosine filter with the aim of reducing amounts of computations, a change of a signal level in the step-like shape occurring at a time of changing a gain factor is not filtered by the raised cosine filter, causing a spread of a signal spectrum up to an adjacent channel and, as a result, the occurrence of spurious signals in the adjacent channel at the time of changing the gain factor.

The seventh point is that, if the modulator is provided with the envelope generator to prevent the occurrence of spurious signals being the above sixth problem, an amount of computation is increased, which causes the computing circuit to do the computation to be made larger in scale and, as a result, it is difficult to miniaturize the circuit. The eighth point is that, if the modulator is provided with the envelope generator to prevent the occurrence of spurious signals being the above sixth problem, an amount of computation is increased, which causes the computing circuit to do the computation to be made larger in scale and, as a result, costs are increased.

The ninth point is that, if the modulator is provided with the envelope generator to prevent the occurrence of spurious signals being the above sixth problem, an amount of computation is increased, which causes the computing circuit to do the computation to be made larger in scale and, as a result, increased power consumption. The tenth point is that, if the modulator is provided with the envelope generator to prevent the occurrence of spurious signals being the above sixth problem, an amount of computation is increased, which causes the computing circuit to do the computation to be made larger in scale and, as a result, increased power consumption, thus causing an amount of heat generation.

The eleventh point is that, even if the modulator is provided with the envelope generator to prevent the occurrence of spurious signals being the above sixth problem, an envelope behavior at a time of changing a gain factor does not occur due to the filtering operation by the raised cosine filter and the envelope behavior is obtained merely by approximation processing by which the envelope characteristics are changed from the step-like shape to the ramp-like shape and, as a result, residual spurious signals exist.

With respect to the above, an object of the present invention is to provide a modulator of small size, low cost, low power consumption and less heat generation. Another object of the present invention is to provide a modulator capable of easily improving signal quality by raising computing accuracy. Still another object of the present invention is to provide a modulator capable of reducing spurious signals.

Means for Solving Problems

According to the present invention, the modulator is provided which includes:
a code modulating unit to receive transmitted data to perform code modulation on the data and to output code-modulated data;
a gain control signal generating unit to generate a gain control signal;
a filter unit to receive an output from the code modulating unit to perform bandwidth restriction on the received signal and to output the bandwidth-restricted signal; and
a gain control unit to receive an output from the gain control signal generating unit and to control a gain of the filter unit.

Here, the gain control signal denotes a gain factor signal representing, for example, a level ratio among code channels in the W-CDMA communication method.

According to the present invention, a gain of a filter can be dynamically controlled according to a gain control signal and, therefore, results of computations being equal to results obtained when a gain is controlled at a stage before the raised cosine filter can be obtained and, when a gain is controlled at the stage before the filter, a signal inputted to the filter being time-series data made up of a plurality of bits can be made to be one-bit time-series data, which enables the reduction of an amount of computation. As a result, it is possible to make the circuit small-sized and to reduce costs, power consumption, and heat generation. Also, expansion of the modulator circuits in scale for improvement of computing accuracy corresponding to the decreased amount of computation achieved by the configurations is made easy, thereby improving quality of signals. Moreover, when a gain factor is changed, no spurious signals are generated, which improves signal quality. Since a means for suppressing spurious signals is not required, miniaturization of the modulator is made possible, which enables reduction in costs, power consumption, and heat generation.

According to the present invention, a modulator is provided which includes:
a first code modulating unit to receive first transmitted data to perform code modulation on the transmitted data to output a first code-modulated output;
a second code modulating unit to receive second transmitted data to perform code modulation on the transmitted data to output a second code-modulated output;
a first gain control signal generating unit to generate a first gain control signal;
a second gain control signal generating unit to generate a second gain control signal;
a first filter unit to receive an output from the first code modulating unit to perform bandwidth restriction on the received data and to output the bandwidth-restricted data;
a second filter unit to receive an output from the second code modulating unit to perform bandwidth restriction on the received data and to output the bandwidth-restricted data;
an adder to receive the outputs from the first and second filter units and to synthesize these outputs;

a first gain control unit to receive an output from the first gain control signal generating unit to control a gain of the first filter unit; and a second gain control unit to receive an output from the second gain control signal generating unit to control a gain of the second filter unit.

In the modulator described above, the first and second filters can be mounted for every plurality of channels multiplexed through encoding.

In the modulator described above, the filter unit includes a time-series data generating section to output time-series data made up of a plurality of signals containing past inputted signals and a setting section to receive an output from said gain control signal generating unit and to set each of a plurality of weighting coefficients so as to be associated with each of a plurality of signals making up said time-series data outputted by said time-series data generating section according to values of the output. The filter unit of the modulator described above may be an FIR filter.

In the modulator described above, the filter unit includes a shift register section to perform shifting processing on an inputted signal to output the signal as time-series data made up of a plurality of signals containing past inputted signals, a plurality of register sections to receive an output from the gain control signal unit and each storing a plurality of weighting coefficients, a plurality of multipliers to receive the plurality of signals making up the time-series data outputted from the register section and the plurality of weighting coefficients outputted from the plurality of registers in synchronization with one another to multiply the signals by weighting coefficients and output the products and an adder to add the outputs from the plurality of multipliers.

In the modulator described above, the filter unit includes a shift register section to perform shifting processing on an inputted signal and to output the signal as time-series data made up of a plurality of signals containing past inputted signals, a shift register to receive an output from the gain control signal generating unit to perform shifting processing and to output the signal as time-series data made up of a plurality of signals containing past gain control signals, a plurality of first multipliers to multiply each of the plurality of signals outputted from the shift register by each of a plurality of specified coefficients and to output the products as a plurality of weighting coefficients, a plurality of second multipliers to receive each of the plurality of signals outputted from the shift register section and each of the plurality of weighting coefficients outputted from the first multipliers in synchronization with one another to multiply the signals by weighting coefficients and to output the products, and an adder to add the outputs from the plurality of second multipliers.

In the modulator described above, the filter unit includes a shift register section to perform shifting processing on an inputted signal to output the signal as time-series data made up of a plurality of signals containing past inputted signals, a plurality of register sections to receive first and second weighting coefficients corresponding to an output from the gain control signal generating unit and to store the weighting coefficients and to switch one of first and second weighting coefficients in accordance with the plurality of signal values outputted from the shift register section and to output the weighting coefficients, and an adder to add the outputs from the plurality of register sections.

In the modulator described above, the filter unit includes a shift register section to perform shifting processing on an inputted signal and to output the signal as time-series data made up of a plurality of signals containing past inputted signals, a shift register to receive an output from the gain control signal generating unit to perform shifting processing and outputs the signal as time-series data consisting of a plurality of signals containing past gain control signals, a plurality of multipliers to multiply each of the plurality of signals output from the shift register by each of a plurality of specified first and second coefficients to output a plurality of first and second weighting coefficients, a plurality of register sections to receive first and second weighting coefficients outputted from the plurality of multipliers and to store the weighting coefficients and to switch one of first and second weighting coefficients in accordance with the plurality of signal values outputted from the shift register section and to output the weighting coefficients, and an adder to add the outputs from said plurality of register sections.

In the above modulator, a signal inputted to the filter section can be one-bit data. In the conventional modulator, when a gain is controlled at a stage before a filter, its input signal is time-series data made up of a plurality of bits, however, according to the modulator of the present invention, by dynamically controlling a weighting coefficient of the filter according to a gain control signal, a signal inputted to the filter can be one-bit time-series data. This enables reduction of an amount of computation.

According to the present invention, there is provided a filter performing bandwidth restriction on code-modulated signals and outputting the bandwidth-restricted signals including:

a time-series data generating unit to output time-series data made up of a plurality of signals containing past inputted signals, and a coefficient setting unit to set a plurality of weighting coefficients in accordance with a gain control signal so as to associate each of the weighting coefficients with each of the plurality of signals of the time-series data outputted the time-series data generating unit, a gain control unit to control a gain according to the plurality of weighting coefficients set by the coefficient setting unit.

In the present invention, by dynamically changing a weighting coefficient in accordance with a gain control signal, an ideal gain control of the filter is made possible. By using this filter, the modulator described above can be realized.

According to the present invention, there is provided a filter gain control method for restricting a bandwidth of a code-modulated inputted signal including:

a step of outputting time-series data made up of a plurality of signals containing past inputted signals;

a step of setting a plurality of weighting coefficients according to a gain control signal so as to be associated with each of a plurality of signals making up the time-series data outputted in the step of outputting the time-series data; and a step of controlling a gain according to the set plurality of weighting coefficients.

According to the present invention, there is provided a code modulating method including;

a step of generating a gain control signal;

a step of receiving an output generated in the step of code-modulating the output and of performing bandwidth-restriction to output the bandwidth-restricted data; and a step of receiving an output generated in the step of the gain control signal and controlling a gain set in the step of performing the bandwidth-restriction.

Moreover, any combination of component elements described above and any expression obtained by converting among the method, apparatus, system, storage medium, compute program, or a like described above can be also employed as aspects of the present invention.

Effects of the Invention

According to the present invention, the modulator is provided which can be made small in size, low in costs, low in power consumption, small in heat generation and spurious signals. Also, the present invention provides the modulator which can easily improve signal quality by increasing computing accuracy. Moreover, the present invention provides the modulator which can decrease spurious signals.

BRIEF DESCRIPTION OF DRAWINGS

FIG. 8 is a diagram showing one example of configurations of a raised cosine filter to be used in the modulator in FIG. 7.

FIG. 9 is a diagram explaining operations of the modulator set forth in the 3GPP specifications in the W-CDMA communication method.

Figure 1:
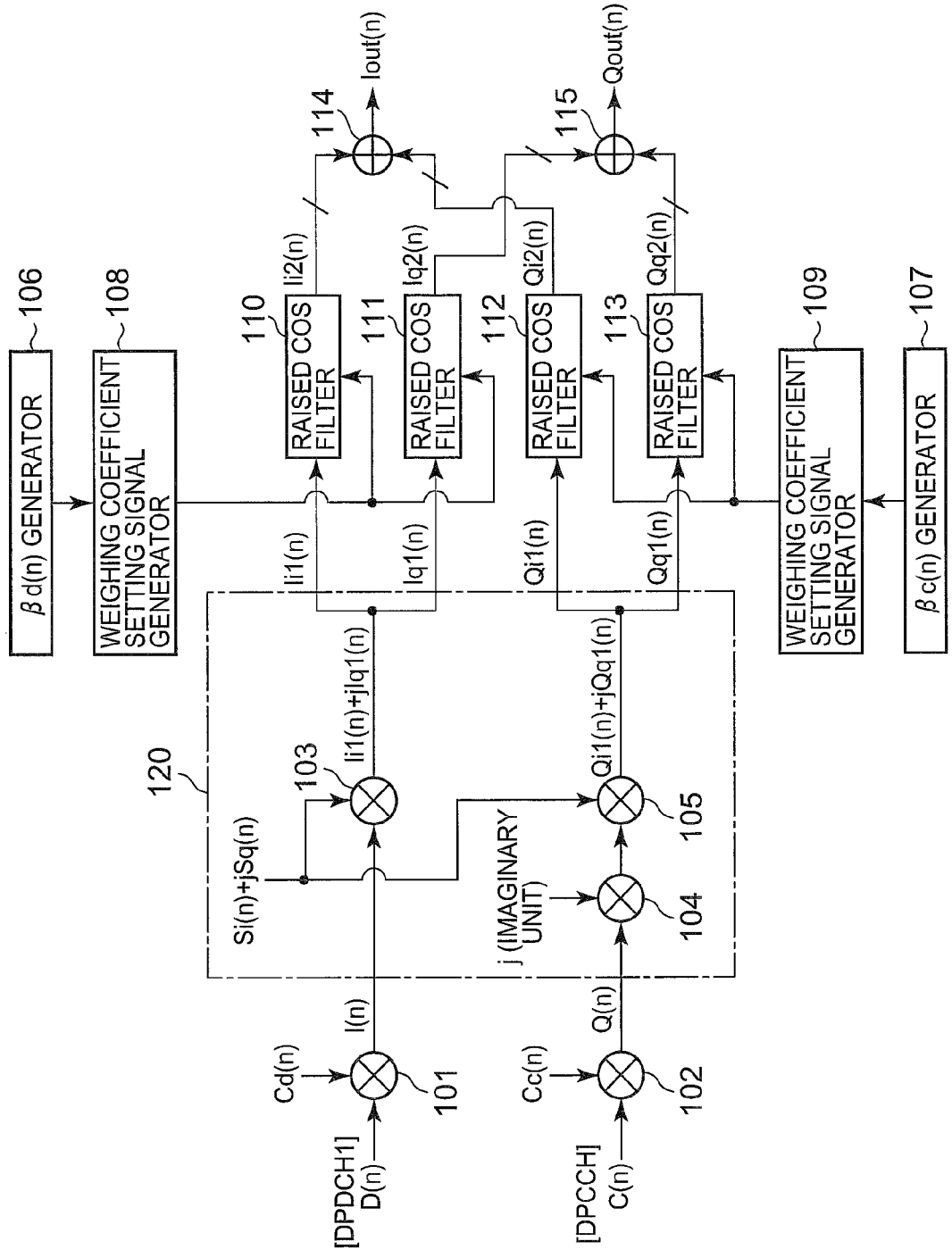
FIG. 1 is a block diagram showing configurations of a modulator of the first embodiment of the present invention.

EXPLANATION OF LETTERS OR NUMERALS 101, 102: Multiplier
103 to 105: Complex-number multiplier
106: Data channel gain factor signal generator
107: Control channel gain factor signal generator
108, 109: Weighting coefficient setting signal generator
110 to 113: Raised cosine filter
114, 115: Adder
120: Complex-number computing section
201: Shift register
202 to 205: Multiplier
206 to 209: Register
210: Adder
301: Shift register
302: Shift register
303 to 306: Multiplier
307 to 310: Multiplier
311: Adder
401: Shift register
402 to 405: Register
406: Adder
501: Shift register
502: Shift register
503 to 506: Register
507 to 510: Multiplier
511: Adder
601 to 604: Multiplier
605 to 610: Complex-number multiplier
611, 613: Data channel gain factor signal generator
612, 614 Control channel gain factor signal generator 615 to 618 Weighting coefficient setting signal generator
619 to 626: Raised cosine filter
627, 628: Adder

BEST MODE OF CARRYING OUT THE INVENTION

Hereinafter, some preferred embodiments of the present invention are described by referring to the accompanied drawings. In all drawings, the same reference number is assigned to same components and their descriptions are omitted accordingly.

First Embodiment

FIG. 1 is a diagram showing configurations of a modulator of the first embodiment of the present invention. The modulator of the first embodiment includes a code modulating section (made up of multipliers 101 and 102, complex-number computing section 120) to receive transmitted data to code-modulate the received data and to output the code-modulated data, a gain control signal generating section (made up of a data channel gain factor signal generator 106 and control channel gain factor signal generator 107) to generate a gain control signal, a filter section (made up of raised cosine filters 110 to 113) to receive an output from the code modulator and to restrict bandwidth and to output bandwidth-restricted signals, and a gain control section (made up of weighting coefficient setting signal generators 108 and 109) to receive an output form the gain control signal generating section and to control a gain of the filter section.

The modulator of the present invention is featured in that a gain of each code channel is controlled by providing a raised cosine filter as bandwidth-restricting filter for every code channel to control a gain of a bandwidth-restricted filter.

That is, the modulator of the first embodiment, as shown in FIG. 1, the first code-modulating section (multiplier 101 and complex-number multiplier 103) to receive the first transmitted data {DPDCH1 channel data D(n)} and to code-modulate the data and to output the first code-modurated output, the second code-modulating section (multiplier 102, complex-number multiplier 104, and complex-number multiplier 105) to receive the second transmitting data {DPCCH channel data C(n)} to code-modulate the data and to output the second code-modulated output, the first gain control signal generating section (data channel gain factor signal generator 106) to generate the first gain control signal, the second gain control signal generating section (control channel gain factor signal generator 107) to generate the second gain control signal, the first filter section (raised cosine filters 110 and 111) to receive the first code-modulated output to restrict bandwidths and to output the bandwidth-restricted signal, the second filter section (raised cosine filters 112 and 113) to receive the second code-modulated output to restrict bandwidths and to output the bandwidth-restricted signal, an adding section (adders 114 and 115) to receive outputs from the first and second filter section to synthesize the data and to output the synthesized signal, the first gain control section (weighting coefficient setting signal generator 108) to control a gain of the first filter section, and the second gain control section (weighting coefficient setting signal generator 109) to control a gain of the second filter section.

Moreover, each component of the modulator is also implemented by the combination of hardware including a given CPU (Central Processing Unit) of a computer, memory, programs stored in the memory to implement various components shown in FIG. 1, a memory unit such as a hard disk storing the program, and an interface for connection to networks and software. It is to be understood by those skilled in the art that various modifications to the implementing method and such devices may be made. Each drawing described below shows not configuration in a hardware unit but blocks in a functional unit.

More specifically, the modulator of the first embodiment includes the multipliers 101 and 102, complex-number computing section 120, data channel gain factor signal generator (shown as a "βd(n) generator" in FIG. 1) 106, control channel gain factor signal generator {shown as a "βc(n) generator" in FIG. 1} 107, weighting setting signal generators 108 and 109, raised cosine filters (shown as a "raised COS filter") 110 to 113, and adders 114 and 115.

In all embodiments, unless otherwise described explicitly, it is understood that components operate with timing being synchronized with a common clock signal. A value corresponding to time "n" of time-series data D is expressed as D(n). Here, the time "n" is discrete time associated with an individual pulse of a clock signal. A signal line with a slope shows a signal line through which time-series data consisting of a plurality of bits is transmitted. Moreover, one-bit value takes a binary value of "−1" or "1".

Each of the multipliers 101 and 102 makes up a channel code modulating means to perform a signal channel coding operation so that each signal out of a plurality of input signals can be identified. The multiplier 101 receives data D(n) of a data channel DPDCH1 being one-bit time-series data and a channelization code Cd(n) of a data channel being an output from a data channelization code generator (not shown) and one-bit time-series data and outputs one-bit time-series data I(n).

The multiplier 102 receives data C(n) of a controlling channel DPCCH being one-bit time-series data and a channelization code Cc(n) of a controlling channel being an output from a control channelization code generator (not shown) and one-bit time-series data and outputs one-bit time-series data Q(n).

Moreover, the complex-number computing section 120 makes up a scramble code modulating means to superpose a scramble code being common to each signal channel and to divide data outputted from the multiplier into data for an in-phase channel and for an orthogonal channel. The complex-number computing section 120 is made up of complex-number multipliers 103, 104, and 105 and a scramble code generator (not shown) to generate a scramble code {Si(n)+jSq(n)}. Here, the Si(n) and Sq(n) are one-bit time-series data and "j" denotes an imaginary unit. Therefore, the {Si(n)+jSq(n)} denotes a complex-number consisting of a real part Si(n) and a coefficient Sq(n) of an imaginary part.

The complex-number multiplier 103 receives the output I(n) from the multiplier 101 and the scramble code Si(n)+jSq(n) and performs complex-number multiplication to output Ii1(n)+jIq1(n). This is a complex-number value consisting of the real part Ii1(n) and the coefficient Iq1(n) of an imaginary part and each of the Ii1(n) and Iq1(n) is one-bit time-series data.

The complex-number multiplier 104 receives an output Q(n) from the multiplier 102 and multiplies the output by an imaginary unit "j" to output a complex-number value jQ(n). The complex-number 105 receives an output jQ(n) from the complex-number multiplier 104 and a scramble code {Si(n)+jSq(n)} and performs complex-number multiplication to output {Qi1(n)+jQq1(n)}. This is a complex-number value consisting of the real part Qi1(n) and the coefficient Qq1(n) of an imaginary part and each of the Qi1(n) and Qq1(n) is one-bit time-series data.

The complex-number computing section 120 outputs coefficients Ii1(n) and Iq1(n) of {Ii1(n)+jIq1(n)} being an output from the complex-number multiplier 103 and coefficients Qi1(n) and Qq1(n) of {Qi1(n)+jQq1(n)} being an output from the complex-number multiplier 105 respectively as real number value one-bit time-series data. Moreover, the channel code modulating means and the scramble code modulating means are referred to as a code modulating means as a whole.

The data channel gain factor signal generator 106 generates a data channel gain factor signal βd(n) and outputs the signal to the weighting coefficient setting signal generator 108. The signal βd(n) is time-series data consisting of a plurality of bits. The weighting coefficient setting signal generator 108 receives a data channel gain factor signal βd(n) being an output from the data channel gain factor signal generator 106 and outputs a data channel weighting coefficient setting signal to the raised cosine filters 110 and 111. The data channel weighting coefficient setting signal is time-series data consisting of a plurality of bits.

The control channel gain factor signal generator 107 generates a control channel gain factor signal βc(n) and outputs the signal to the weighting coefficient setting signal generator 109. The signal βc(n) is time-series data consisting of a plurality of bits. The weighting coefficient setting signal generator 109 receives a control channel gain factor signal βc(n) being an output from the control channel gain factor signal generator 107 and outputs a control channel weighting coefficient setting signal to the raised cosine filters 112 and 113. The control channel weighting coefficient setting signal is time-series data consisting of a plurality of bits.

The weighting coefficient setting signal generators 108 and 109 make up a gain control signal generating means to generate a controlling signal used to control a gain of the filter means.

Each of the raised cosine filters 110, 111, 112, and 113 performs a bandwidth restricting operation on every signal generated by the code modulating means for every in-phase channel and for every orthogonal channel and makes up a filter means that controls its gain.

The raised cosine filter 110 receives an output Ii1(n) from the complex-number computing section 120 and a data channel weighting coefficient setting signal being an output from the weighting coefficient setting signal generator 108 and outputs data Ii2(n) being time-series data consisting of a plurality of bits. The raised cosine filter 111 receives an output Iq1(n) from the complex-number computing section 120 and a data channel weighting coefficient setting signal being an output from the weighting coefficient setting signal generator 108 and outputs data Iq2(n) being time-series data consisting of a plurality of bits.

The raised cosine filter 112 receives an output Qi1(n) from the complex-number computing section 120 and a control channel weighting coefficient setting signal being an output from the weighting coefficient setting signal generator 109 and outputs data Qi2(n) being time-series data consisting of a plurality of bits. The raised cosine filter 113 receives an output Qq1(n) from the complex-number computing section 120 and a control channel weighting coefficient setting signal being an output from the weighting coefficient setting signal generator 109 and outputs data Qq2(n) being time-series data consisting of a plurality of bits.

The adder 114 receives an output Ii2(n) from the raised cosine filter 110 and an output Qi2(n) from the raised cosine filter 112 and outputs a modulator in-phase component output Iout(n) being time-series data consisting of a plurality of bits. The adder 115 receives data Iq2(n) being an output from the raised cosine filter 111 and data Qq2(n) being an output from the raised cosine filter 113 and outputs a modulator orthogonal component output Qout(n) being time-series data consisting of a plurality of bits.

The adders 114 and 115 make up an adding means to synthesize outputs from the raised cosine filters 110 to 113 being a filter means for every in-phase channel and for every orthogonal channel.

Figure 2:
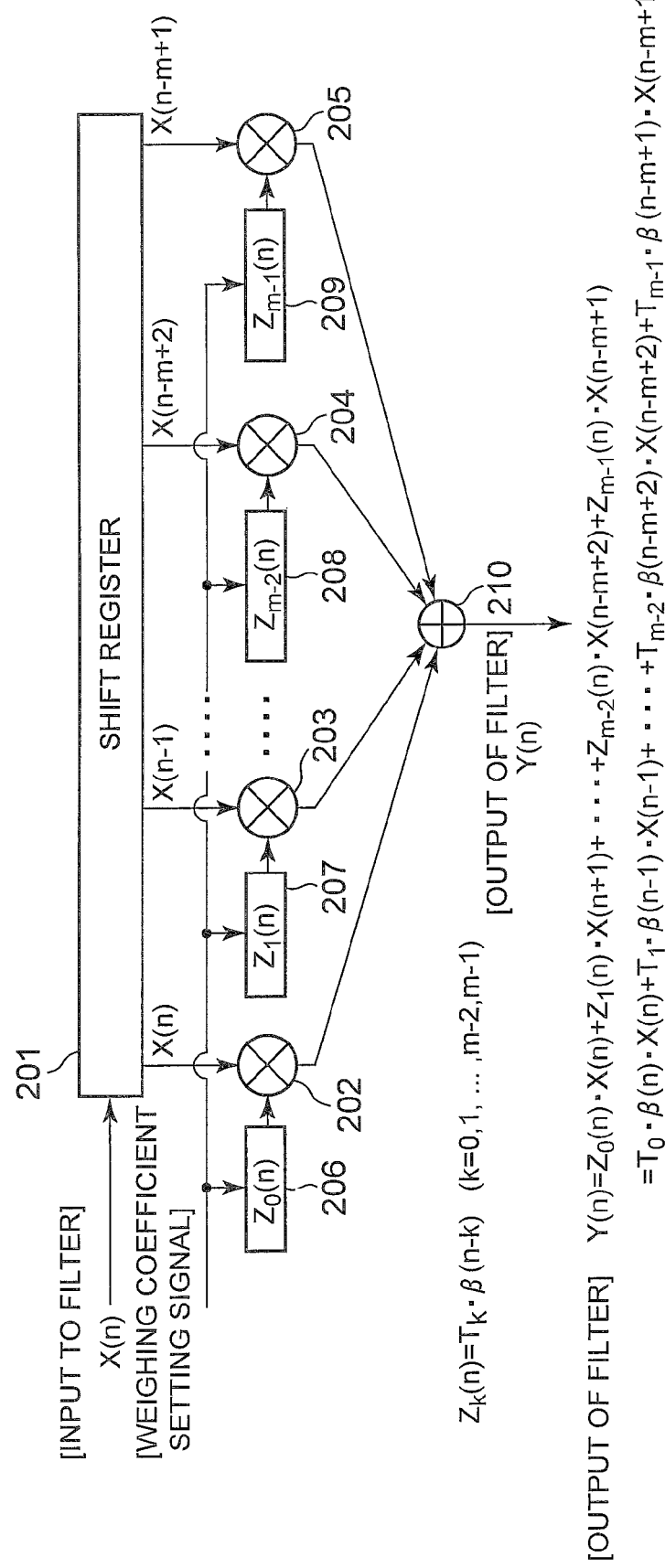
FIG. 2 is a block diagram showing configurations of an FIR filter of the first embodiment of the present invention.

FIG. 2 shows one example of configurations of each of the raised cosine filters 110 to 113. The raised cosine filter of the first embodiment is a filter to perform a bandwidth restricting operation on a code-modulated signal and to output the code-modulated signal and also includes a time-series data generating section (shift register 201) to output time-series data consisting of a plurality of signals containing past inputted signals, coefficient setting sections (registers 206, 207, 208, and 209) to associate a plurality of weighting coefficients with each of a plurality of signals for time-series data output from the time-series data generating section according to a gain control signal, and gain controlling sections (multipliers 202, 203, 204, and 205) to control a gain using a plurality of weighting coefficients set by the coefficient setting sections.

The first embodiment is characterized in that a gain of the raised cosine filter is controlled by using an FIR filter as the raised cosine filter and by dynamically controlling a gain of the raised cosine filter.

Here, in the FIR filter, with a ratio among weighting coefficients remained fixed, if all the coefficients are multiplied by the same constant number (for example, multiplied by $\beta$), in the frequency characteristics, entire gains are uniformly multiplied by $\beta$ and a relative difference in gains between given two frequencies remains unchanged. In contrast to the above, if the ratio among weighting coefficients is changed, the relative difference in gains can be varied, which enables a desired cutoff characteristic and an amount of attenuation to be obtained in some cases.

In general, in an uplink from a mobile terminal employing the W-CDMA communication method toward a base station, a filter having a rolloff characteristic is inserted in order to restrict a bandwidth without the occurrence of intersymbol interference. Basically, this filter is inserted equally both on a signal sender side and a signal receiver side and, therefore, this filter is called a "route rolloff filter". In each of the embodiments of the present invention, the route rolloff filter is implemented on the sender side of a mobile terminal as the raised cosine filter made up of the FIR filter. The rolloff characteristic is represented by a coefficient called a rolloff factor which is designated to be 0.22 according to the 3GPP specifications for the W-CDMA communication method.

Moreover, in the mobile terminal transmitting system using the W-CDMA communication method, as a principle, the system is designed so that the route rolloff characteristic is obtained by using the raised cosine filter only, however, actually, a frequency characteristic of a circuit other than the raised cosine filter (hereinafter referred to as the other circuit) is included in a superimposed manner. Therefore, by calibrating the raised cosine filter so that a frequency characteristic of the other circuit is corrected, if the route rolloff characteristic is satisfied in an entire transmitting system, quality of transmitting signals can be improved.

Since the frequency characteristic of the other circuit varies depending on every mobile terminal, preferably, the ratio among weighting coefficients of the FIR filter making up the raised cosine filter is allowed to be changed to be a given value so that the variations can be accommodated.

Furthermore, in some cases, a plurality of signal forms is covered by the same transmitting device. For example, in the CDMA communication method, a narrow-band CDMA method set forth in 3GPP2 specifications is available, which corresponds to the W-CDMA designated by the 3GPP specifications and, when these transmitting signals are generated in the same transmitting system, it is necessary that the cutoff frequency and rolloff characteristic of the raised cosine filter meet the system requirement. Thus, in order for the same transmitting device to cover a plurality of signal forms, it is desirous that the ratio among weighting coefficients of the FIR filter making up the raised cosine filter can be changed to be a given value.

The raised cosine filter of the first embodiment includes a shift register section (shift register 201) to perform a shifting operation on inputted signals X(n) and to output the signals as time-series data (X(n), X(n−1), ..., X(n−m+2), X(n−m+1)) each consisting of a plurality of signals containing past inputted signals, a plurality of register sections (registers 206, 207, 208, and 209) each storing a plurality of weighting coefficients ($Z0(n)$, $Z1(n)$, ..., $Zm-2(n)$, $Zm-1(n)$ according to each controlling signal and outputting each of these weighting coefficients, a plurality of multipliers 202, 203, 204, and 205 each receiving a plurality of signals of the time-series data outputted from the shift register section and a plurality of weighting coefficients outputted from the register section in synchronization with one another and performing multiplication thereof and outputting the products, and an adder 219 to add outputs from a plurality of multipliers.

The shift register 201 is a register to perform a shifting processing on inputted signals and fetches present and past inputted signals, which receives inputted signals X(n) and to output m-pieces of outputs, that is, X(n), X(n−1), ..., X(n−m+2), X(n−m+1). Here, the signal X(n) is the same value as the inputted signal, X(n−1) is an inputted signal existed one clock before, in the same manner thereafter and then, the signal X(n−m+2) is an inputted signal existed (m−2) clocks before, and the signal X(n−m+1) is an inputted signal existed (m−1) clocks before. All these signals are one-bit time-series data. Moreover, in FIG. 2, only four registers 206, 207, 208, and 209 and only four multipliers 202, 203, 204, and 205 are shown, however, m-sets of the registers and multipliers may be provided in a manner to correspond to m-pieces of outputs from the shift registers 201.

Each of the plurality of registers 206, 207, 208, and 209 receives each of weighting coefficient setting signals, that is, each signal outputted from the weighting coefficient setting signal generators 108 and 109 shown in FIG. 1 and stores these outputs and then outputs them to each of the multipliers 202, 203, 204, and 205. As shown in FIG. 2, each of the registers 206, 207, 208, and 209 stores each of the weighting coefficients $Z0(n)$, $Z1(n)$, $Zm-2(n)$, $Zm-1(n)$ and also outputs these coefficients. Moreover, each of the weighting coefficients $Z0(n)$, $Z1(1)$, $Zm-2(m)$, $Zm-1$ is time-series data consisting of a plurality of bits which is outputted in synchronization with each of the plurality of signals X(n), X(n−1), ..., X(n−m+2), X(n−m+1).

The weighting coefficient setting signals inputted to the registers from the weighting coefficient setting signal generators 108 and 109 shown in FIG. 1 contain weighting coefficients $Z0(n)$, $Z1(n)$, $Zm-2(n)$, $Zm-1(n)$ each being time-series data consisting of a plurality of bits and register specifying signals used to write each of the weighting coefficients into each of registers 206 to 209, and synchronization controlling signals and each of the plurality of signals X(n), X(n−1), ..., X(n−m+2), X(n−m+1) outputted from the shift register 201 is associated with each of the weighting coefficients $Z0(n)$, $Z1(n)$, $Zm-2(n)$, $Zm-1(n)$.

Each of the plurality of multipliers 202, 203, 204, and 205 receives each of the weighting coefficients $Z0(n)$, $Z1(n)$, Zm−2(n), Zm−1(n) being outputs from the plurality of registers 206, 207, 208, and 209 and multiplies these weighting coefficients by the plurality of outputs X(n), X(n−1), . . . , X(n−m+2), X(n−m+1) outputted from the shift register 201 and outputs results from the multiplication each being time-series data consisting of a plurality of bits to the adder 210.

The adder 210 receives the outputs from the multipliers 202, 203, 204, and 205 and adds the outputs and generates a filter output Y(n) being time-series data consisting of a plurality of bits.

Configurations of the first embodiment are described in detail as above, however, the multipliers 101 and 102, complex-number multipliers 103, 104, and 105, adders 114 and 115 shown in FIG. 1 and the shift register 201, multipliers 202, 203, 204, and 205, adder 210 shown in FIG. 2 are known to those skilled in the art and are not directly related to the present invention and their detailed descriptions are omitted accordingly.

Operations of the modulator of the first embodiment so configured as above are described by referring to FIG. 1 below.

In FIG. 1, data D(n) of the data channel DPDCH1 being one-bit time-series data is inputted to the multiplier 101 and is multiplied by a channelization code Cd(n) of the data channel also being one-bit time-series data to be converted into one-bit time-series data I(n). The data I(n) is shown by the following equation (12).

$$I(n)=D(n) \times Cd(n) \quad (12)$$

Data C(n) of the control channel DPCCH being one-bit time-series data is inputted to the multiplier 102 and is multiplied by a channelization code Cc(n) of the control channel also being one-bit time-series data to be converted into one-bit time-series data Q(n). The data Q(n) is shown by the following equation (13).

$$Q(n)=C(n) \times Cc(n) \quad (13)$$

Then, the one-bit time-series data I(n) and Q(n) are inputted to the complex-number multiplying section 120. In the complex-number computing section 120, the one-bit time-series data I(n) is inputted to the complex-number multiplier 103 and is multiplied by a scramble code {Si(n)+jSq(n)} generated by the scramble code generator (not shown) and outputs {Ii1(n)+jIq1(n)}. Here, "j" represents an imaginary unit and {Si(n)+jSq(n)} denotes a complex-number having the real part Si(n) and the coefficient of the imaginary part Sq(n). Each of the Si(n) and Sq(n) is also one-bit time-series data. The {(Ii1(n)+jIq1(n)}, Ii1(n), Iq1(n) are shown respectively by the following equations (14), (15), and (16).

$$Ii1(n) + jIq1(n) = I(n) \times \{Si(n) + jSq(n)\} \quad (14)$$

$$Ii1(n) = I(n) \times Si(n) = D(n) \times Cd(n) \times Si(n) \quad (15)$$

$$Iq1(n) = Q(n) \times Sq(n) = D(n) \times Cd(n) \times Sq(n) \quad (16)$$

On the other hand, in the complex-number computing section 120, the one-bit time-series data Q(n) is treated as an orthogonal component input. Therefore, the imaginary unit "j" is multiplied when the Q(n) is input and, thereafter, the data Q(n) is used as the orthogonal component for computation. More specifically, the Q(n) is input to the complex-number multiplier 104 and is multiplied by the imaginary unit "j" and is outputted.

The output jQ(n) from the complex-number multiplier 104 is inputted to the complex-number multiplier 105 and is multiplied by a scramble code {Si(n)+jSq(n)} generated by the scramble code generator (not shown) and the {Qi1(n)+jQq1(n)} are outputted. The outputs {Qi1(n)+jQq1(n)}, Qi1(n), Qq1(n) are shown respectively by the following equations (17), (18) and (19).

$$Qi1(n) + jQq1(n) = jQ(n) \times \{Si(n) + jSq(n)\} \quad (17)$$

$$Qi1(n) = -Q(n) \times Sq(n) = -C(n) \times Cc(n) \times Sq(n) \quad (18)$$

$$Qq1(n) = Q(n) \times Si(n) = C(n) \times Cc(n) \times Si(n) \quad (19)$$

The complex-number computing section 120 has a function of separating each of the coefficients Ii1(n), Iq1(n) and Qi1(n), Qq1(n) of the complex-number outputs from the multipliers 103 and 105 as a real number value and outputs each of the coefficients as one-bit time-series data.

The data channel gain factor signal generator 106 generates a data channel gain factor signal βd(n). The data channel gain factor signal βd(n) is time-series data consisting of a plurality of bits used to set a modulator gain for the data channel DPDCH1 for a level of the data channel DPDCH1 of a modulator output.

The data channel gain factor signal βd(n) is inputted to the weighting coefficient setting signal generator 108 and is converted into a data channel weighting coefficient setting signal being time-series consisting of a plurality of bits. The data channel weighting coefficient setting signal is inputted to the raised cosine filters 110 and 111.

The output Ii1(n) from the complex-number computing section 120 being one-bit time-series data and the data channel weighting coefficient setting signal being time-series data consisting of a plurality of bits are inputted to the raised cosine filter 110 and the signal Ii2(n) being time-series data consisting of a plurality of bits is outputted.

The output Iq1(n) from the complex-number computing section 120 being one-bit time-series data and the data channel weighting coefficient setting signal being time-series data consisting of a plurality of bits are inputted to the raised cosine filter 111 and the signal Iq2(n) being time-series data consisting of a plurality of bits is outputted.

The control channel gain factor signal generator 107 generates a control channel gain factor signal βc(n). The control channel gain factor signal β c(n) is time-series data consisting of a plurality of bits used to set a modulator gain for the control channel DPCCH for a level of the control channel DPCCH of a modulator output.

The control channel gain factor signal βc(n) is inputted to the weighting coefficient setting signal generator 109 and is converted into a control channel weighting coefficient setting signal being time-series consisting of a plurality of bits. The control channel weighting coefficient setting signal is inputted to the raised cosine filters 112 and 113.

The output Qi1(n) from the complex-number computing section 120 being one-bit time-series data and the control channel weighting coefficient setting signal being time-series data consisting of a plurality of bits are inputted to the raised cosine filter 112 and the signal Qi2(n) being time-series data consisting of a plurality of bits is outputted.

The output Qq1(n) from the complex-number computing section 120 being one-bit time-series data and the control channel weighting coefficient setting signal being time-series data consisting of a plurality of bits are inputted to the raised cosine filter 113 and the signal Qq2(n) being time-series data consisting of a plurality of bits is outputted.

The data Ii2($n$) being an output from the raised cosine filter 110 and the data Qi2 being an output from the raised cosine filter 112 are inputted to the adder 114 and added therein and are outputted as a modulator in-phase component output Iout(n) being time-series data consisting of a plurality of bits. The output Iout(n) is shown by the following equation (20).

$$\text{Iout}(n) = Ii2(n) + Qi2(n) \qquad (20)$$

The data Iq2($n$) being an output from the raised cosine filter 111 and the data Qq2 being an output from the raised cosine filter 113 are inputted to the adder 115 and added therein and are outputted as a modulator orthogonal component output Qout(n) being time-series data consisting of a plurality of bits. The output Qout(n) is shown by the following equation (21).

$$\text{Qout}(n) = Iq2(n) + Qq2(n) \qquad (21)$$

Next, operations of the raised cosine filter of the first embodiment are described by referring to FIG. 2. As described above, the raised cosine filter of the first embodiment is made up of FIR filters. Hereinafter, the state of operations of the filter at the time "n" is explained, however, its operation is the same as at any other time.

When the input signal X(n) being one-bit time-series data is inputted to the shift register with (m−1) stages, m-pieces of one-bit time-series data X(n), X(n−1), ..., X(n−m+2), X(n−m+1) are outputted from the shift register as signal outputs. Here, the signal X(n) is the same value as the input signal, the signal X(n−1) is an inputted signal existed one clock before, in the same manner thereafter and then, the signal X(n−m+2) is an inputted signal existed (m−2) clocks before, and the signal X(n−m+1) is an inputted signal existed (m−1) clocks before.

The output X(n) is inputted to the multiplier 202, the output X(n−1) to the multiplier 203, the output (n−m+2) to the multiplier 204, and the output X(n−m+1) to the multiplier 205.

On the other hand, according to a weighting coefficient setting signal, the weighting coefficients Z0($n$), Z1($n$), Zm−2($n$), Zm−1($m$) each being data having a plurality of bits are stored respectively in the registers 206, 207, 208, and 209 and these weighting coefficients are outputted to each of the multipliers 202, 203, 204, and 205. Here, the weighting coefficient Zk(n) is given by the following equation (22). Hereinafter, K=0, 1, ..., m−2, and m−1.

$$Zk(n) = Tk \cdot \beta(n-k) \qquad (22)$$

The value Tk is a static weighting coefficient which determines a static filter basic characteristic of the FIR filter and is data made up of a plurality of bits and is not changed depending on time. The data β(n−k) is a gain factor at the time (n−k) being data made up of a plurality of bits. It is clear from above that the weighting coefficient ZK(n) is a value that changes depending on the time "n".

The outputs X(n), X(n−1), X(n−m+2), X(n−m+1) from the shift register 201 and the weighting coefficients Z0($n$), Z1($n$), Zm−2($n$), Zm−1($n$) being outputs from registers 206, 207, 208, and 209 are inputted respectively to the multipliers 202, 203, 204, and 205 and are multiplied therein. Each of the outputs from the multipliers 202, 203, 204, and 205 is data consisting of a plurality of bits. All pieces of the data are inputted to the adder 210 and are added therein and are output as the filter output Y(n). The filter output Y(n) is data made up of a plurality of bits. The filter output Y(n) is shown by the following equation (23).

$$Y(n) = Z0(n) \cdot X(n) + Z1(n) \cdot X(n-1) + \ldots + Zm-2(n) \cdot X(n-m+2) + Zm-1(n) \cdot X(n-m+1) = T0 \cdot \beta(n) \cdot X(n) + T1 \cdot \beta$$
$$(n-1) \cdot X(n-1) + \ldots + Tm2 \cdot \beta(n-m+2) \cdot X(n-m+2) + Tm-1 \cdot \beta(n-m+1) \cdot X(n-m+1) \qquad (23)$$

When the FIR filter is used as the raised cosine filter for the modulator shown in FIG. 1, the β(n−k) corresponds to a data channel gain factor signal βd(n) generated by the data channel gain factor signal 106 and a control channel gain factor signal βc(n). Each of these signals is multiplied by a static weighting coefficient Tk in each of the weighting coefficient setting signal generator 108 and 109 and converted into a weighting coefficient Zk(n) and inputted to the raised cosine filter 110, 111, 112, and 113 as weighting coefficient setting signals.

Each of the data Ii1($n$), Iq1($n$), Qi1($n$), and Qq1($n$) corresponds sequentially to the input X($n$) of the raised cosine filters 110, 111, 112, and 113 and each of the data Ii2($n$), Iq2($n$), Qi2($n$), and Qq2($n$) corresponds sequentially to the output Y(n) of the raised cosine filters 110, 111, 112, and 113.

The data Ii2($n$) being an output from the raised cosine filter 110 and the data Qi2($n$) being an output from the raised cosine filter 112 are inputted to the adder 114 and added therein and then are outputted as a modulator in-phase component output Iout(n). By rearranging the output Iout(n) of the above equation (20) using the above equation (23), the following equation (24) can be obtained.

$$\text{Iout}(n) = \qquad (24)$$
$$Ii2(n) + Qi2(n) = T0 \cdot \beta d(n) \cdot Ii1(n) + T1 \cdot \beta d(n-1) \cdot Ii1(n-1) +$$
$$\ldots + Tm-2 \cdot \beta d(n-m+2) \cdot Ii1(n-m+2) +$$
$$Tm-1 \cdot \beta d(n-m+1) \cdot Ii1(n-m+1) +$$
$$T0 \cdot \beta c(n) \cdot Qi1(n) + T1 \cdot \beta c(n-1) \cdot Qi1(n-1) +$$
$$\ldots + Tm-2 \cdot \beta c(n-m+2) \cdot Qi1(n-m+2) +$$
$$Tm-1 \cdot \beta c(n-m+1) \cdot Qi1(n-m+1) =$$
$$T0 \cdot \{\beta d(n) \cdot Ii1(n) + \beta c(n) \cdot Qi1(n)\} +$$
$$T1 \cdot \{\beta d(n-1) \cdot Ii1(n-1) + \beta c(n-1) \cdot Qi1(n-1)\} +$$
$$\ldots + Tm-2 \cdot \{\beta d(n-m+2) \cdot Ii1(n-m+2) +$$
$$\beta c(n-m+2) \cdot Qi1(n-m+2)\} +$$
$$Tm-1 \cdot \{\beta d(n-m+1) \cdot Ii1(n-m+1) +$$
$$\beta c(n-m+1) \cdot Qi1(n-m+1)\}$$

Moreover, the data Iq2($n$) being an output from the raised cosine filter 111 and the data Qq2($n$) being an output from the raised cosine filter 113 are inputted to the adder 115 and added therein and are outputted as a modulator orthogonal component output Qout(n). By rearranging the Qout(n) in the above equation (21) using the above equation (23), the following equation (25) can be obtained.

$$\text{Iout}(n) = \qquad (25)$$
$$Iq2(n) + Qq2(n) = T0 \cdot \beta d(n) \cdot Iq1(n) + T1 \cdot \beta d(n-1) \cdot Iq1(n-1) +$$
$$\ldots + Tm-2 \cdot \beta d(n-m+2) \cdot Iq1(n-m+2) +$$
$$Tm-1 \cdot \beta d(n-m+1) \cdot Iq1(n-m+1) +$$
$$T0 \cdot \beta c(n) \cdot Qq1(n) + T1 \cdot \beta c(n-1) \cdot Qq1(n-1) +$$
$$\ldots + Tm-2 \cdot \beta c(n-m+2) \cdot Qq1(n-m+2) +$$
$$Tm-1 \cdot \beta c(n-m+1) \cdot Qq1(n-m+1) =$$

-continued $$T0 \cdot \{\beta d(n) \cdot Iq1(n) + \beta c(n) \cdot Qq1(n)\} +$$
$$T1 \cdot \{\beta d(n-1) \cdot Iq1(n-1) + \beta c(n-1) \cdot Qq1(n-1) +$$
$$\ldots + Tm - 2 \cdot \{\beta d(n-m+2) \cdot Iq1(n-m+2) +$$
$$\beta c(n-m+2) \cdot Qq1(n-m+2) + Tm -$$
$$1 \cdot \{\beta d(n-m+1) \cdot Iq1(n-m+1) +$$
$$\beta c(n-m+1) \cdot Qq1(n-m+1)\}$$

By substituting the equations (15), (16), (18), and (19) into the above equations (24) and (25) and by rearranging these equations, the following equations (26) and (27) can be obtained.

$$Iout(n)=T0\cdot\{\beta d(n)\cdot D(n)\cdot Cd(n)\cdot Si(n)-\beta c(n)\cdot C(n)\cdot Cc(n)\cdot Sq(n)\}+T1\cdot\{\beta d(n-1)\cdot D(n-1)\cdot Cd(n-1)\cdot Si(n-1)-\beta c(n-1)\cdot C(n-1)\cdot Cc(n-1)\cdot Sq(n-1)\}+\ldots \\ +Tm-2\cdot\{\beta d(n-m+2)\cdot D(n-m+2)\cdot Cd(n-m+2)\cdot Si(n-m+2)-\beta c(n-m+2)\cdot C(n-m+2)\cdot Cc(n-m+2)\cdot Sq(n-m+2)+Tm-1\{\beta d(n-m+1)\cdot D(n-m+1)\cdot Cd(n-m+1)\cdot Si(n-m+1)-\beta c(n-m+1)\cdot C(n-m+1)\cdot Cc(n-m+1)\cdot Si(n-m+1)\} \quad (26)$$

$$Qout(n)=T0\cdot\{d(n)\cdot D(n)\cdot Cd(n)\cdot Sq(n)+\beta c(n)\cdot C(n)\cdot Cc(n)\cdot Si(n)\}+T1\cdot\{\beta d(n-1)\cdot D(n-1)\cdot Cd(n-1)\cdot Sq(n-1)+\beta c(n-1)\cdot C(n-1)\cdot Cc(n-1)\cdot Si(n-1)\}+\ldots +Tm-2\cdot\{\beta d(n-m+2)\cdot D(n-m+2)\cdot Cd(n-m+2)\cdot Sq(n-m+2)+\beta c(n-m+2)\cdot C(n-m+2)\cdot Cc(n-m+2)\cdot Si(n-m+2)\}+Tm-1\cdot\{\beta d(n-m+1)\cdot D(n-m+1)\cdot Cd(n-m+1)\cdot Sq(n-m+1)+\beta c(n-m+1)\cdot C(n-m+1)\cdot Cc(n-m+1)\cdot Si(n-m+1)\} \quad (27)$$

It is to be understood that the outputs obtained from the above equations (26) and (27) are the same as those obtained from the above equations (10) and (11) representing the outputs generated by performing bandwidth restrictions on modulator outputs designated in the 3GPP specifications using a raised cosine filter.

As described above, according to the modulator of the first embodiment, the weighting coefficients of the FIR filter making up the raised cosine filter can be controlled according to the data channel gain factor signal $\beta d(n)$ and the control channel gain factor signal $\beta c(n)$ and, therefore, an input signal of the FIR filter becomes one-bit data, thus enabling the reduction in an amount of computations.

As a result, effects of enabling the circuits to be small in size, low in costs, power consumption, and amount of heat generation can be achieved. Moreover, owing to the reduction in amounts of computations, a margin of expansion of the circuit scale for improvement of computing accuracy can be made large, thereby providing an effect of easily improving signal quality.

Moreover, according to the modulator of the first embodiment, the weighting coefficient of the filter making up the raised cosine filter can be dynamically changed according to the data channel gain factor signal and the control channel gain factor signal and, therefore, as is understood from the equations (26) and (27), results of computations being equal to results obtained when a gain is controlled at a stage before the raised cosine filter can be achieved.

Thus, unlike the technologies disclosed in the Patent Reference 1 and Patent Reference 2, no spurious occur when a gain factor is changed, which can improve signal quality. Moreover, no spurious suppressing means is required, which enables miniaturization of the circuits and reduction in costs, power consumption, and amount of heat generation.

Figure 7:
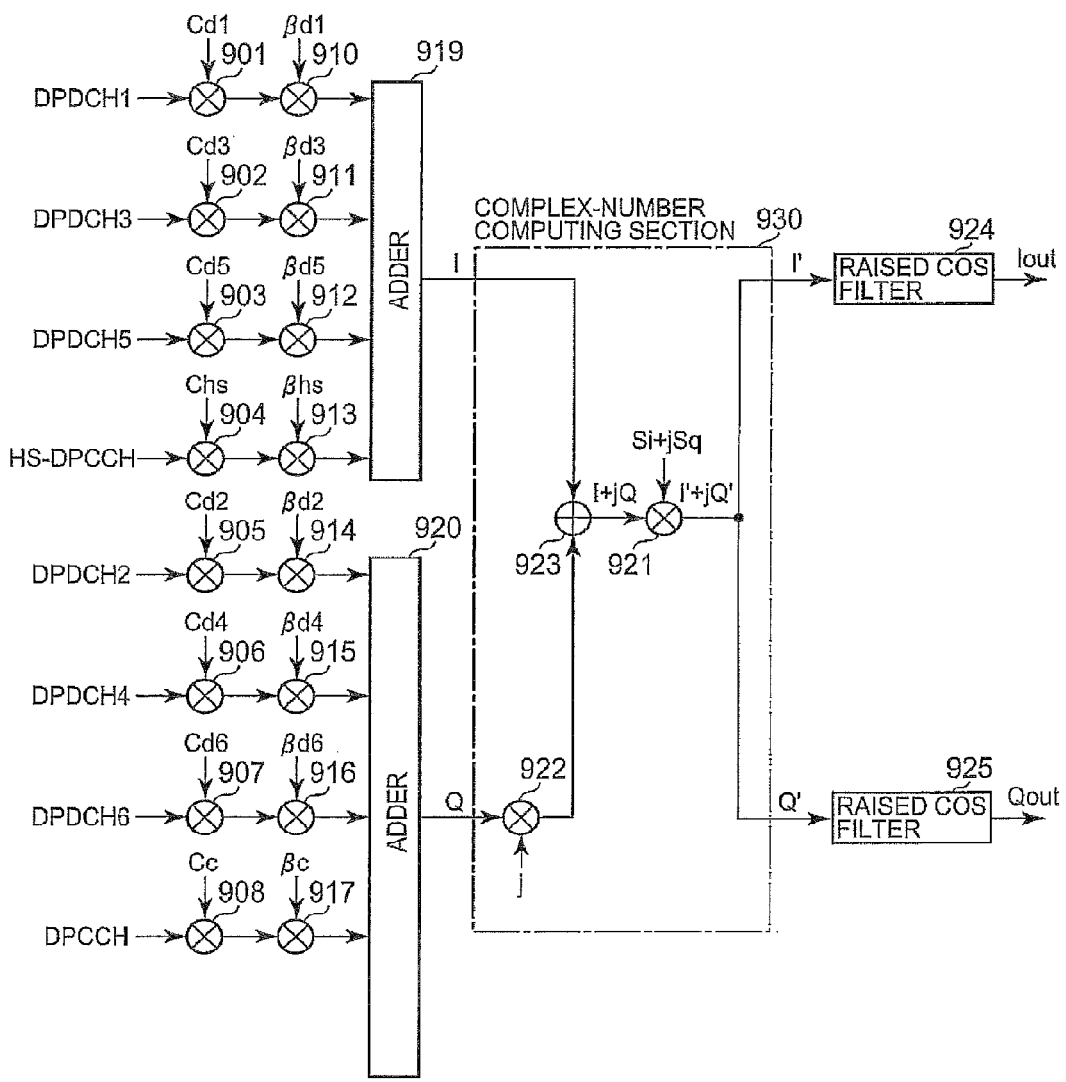
FIG. 7 is a diagram showing one example of configurations of the modulator set forth in 3GPP specifications in a W-CDMA communication method.

Furthermore, the number of raised cosine filters in the first embodiment is 4 pieces being larger when compared with the configurations shown in FIG. 7 in which the number of raised cosine filters is 2. However, if the weighting coefficient is the same, an input consists of one bit in the first embodiment, however, in the example of the configurations based on a modulator designated in the 3GPP specifications, an input consists of 10 bits or more and, therefore, it is clear that an amount of computations is reduced. This is also shown in the Patent References 1 and 2.

Also, at the time when a weighting coefficient is generated, a plurality of bits making up a gain factor of a data channel or a control channel is multiplied by a plurality of bits making up a static weighting coefficient, however, this multiplication occurs only when the gain factor is changed. On the other hand, in the W-CDMA communication method, since a change of a gain factor occurs at intervals of at least 256 chips or more, the frequency of the occurrence of the multiplication is small compared with the frequency in the raised cosine filter, which does not impair the effect of reducing an amount of computation.

Also, in the W-CDMA communication system, the gain factor signal ($\beta$) represents a level ratio (equivalent to an amplitude) between code channels. In the mobile terminal communication, radio-frequency transmitting power is specified separately from the gain factor signal ($\beta$). The gain factor signal ($\beta$) represents a breakdown of each code channel power in the high-frequency transmitting power.

In transmitting power having radio-frequency transmitting power of 50 mW on which a code channel A with the $\beta$ being 1 and a code channel B with the $\beta$ being 2 are superimposed, a power component of the code channel A is 10 mW and a power component of the code channel B is 40 mW. On the other hand, in transmitting power having radio-frequency transmitting power of 50 mW on which a code channel A with the $\beta$ being 0.1 and a code channel B with the $\beta$ being 0.2 are superimposed, a power component of the code channel A is 10 mW and a power component of the code channel B is 40 mW. In a modulator output, output power of the code channel A with the $\beta$ being 1 and the code channel B with the $\beta$ being 2 is 100-times larger than that of the code channel A with the $\beta$ being 0.1 and the code channel B with the $\beta$ being 0.2, however, a gain is compensated for in the transmitting amplifier at the later stage.

In the W-CDMA communication system, a mobile transmitting signal is received by a base station and signal quality is monitored for every code channel. Based on the result from the monitoring, the base station returns information about quality of received signals for every channel back to the mobile terminal. By using the information about quality of received signals as reference information, the mobile terminal determines a power value for every transmitting code channel. Moreover, the base station transmits a control signal for all transmitting power to the mobile terminal.

The mobile terminal also changes transmitting signal conditions such as occurrence and vanishing of a transmitting code channel, spreading rate, or a like momentarily. The mobile terminal itself, while adding instruction information from a base station to its own transmitting signal conditions, determines the $\beta$ value and provides a modulator with instructions.

Second Embodiment

Figure 3:
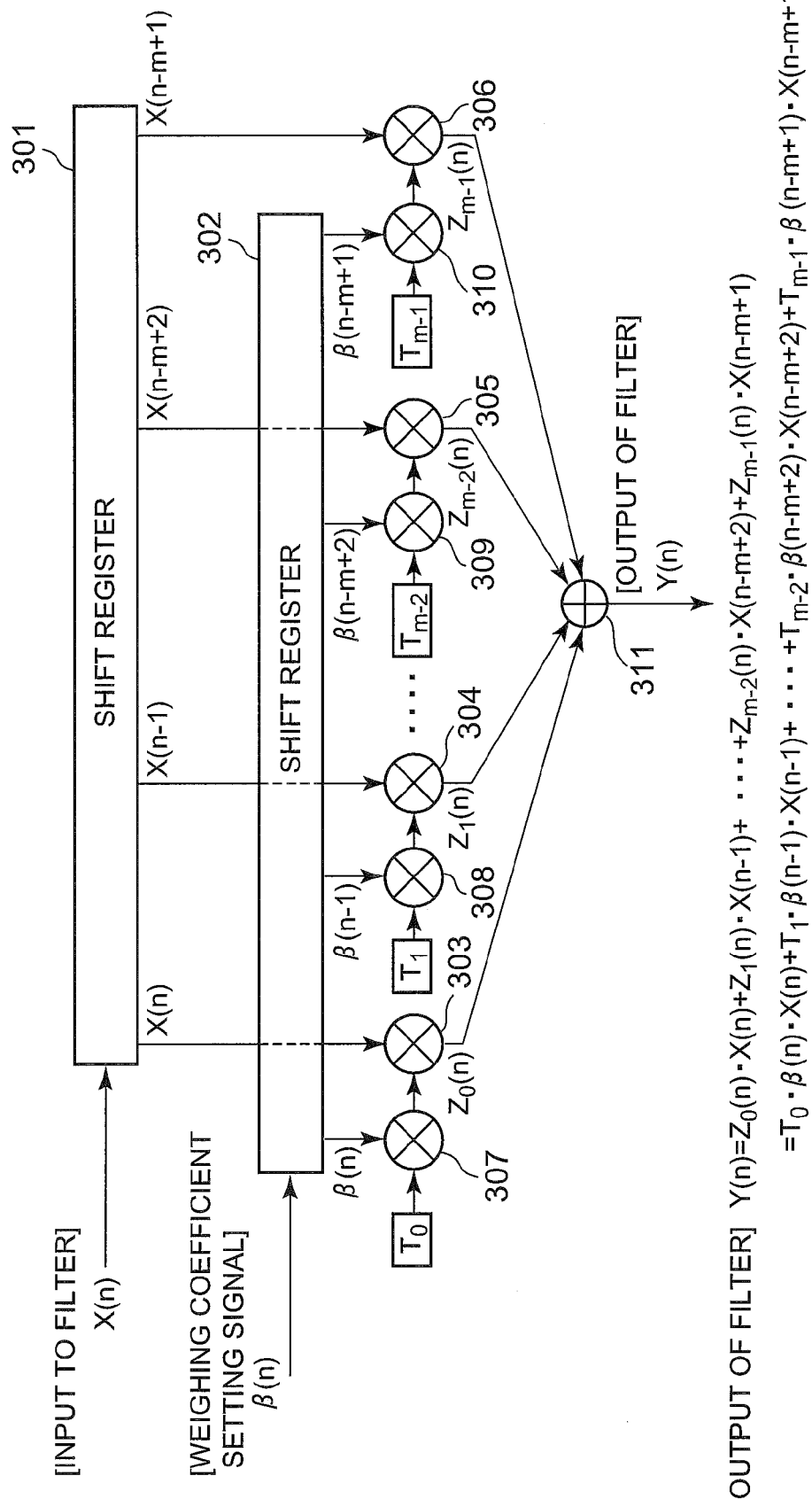
FIG. 3 is a block diagram showing configurations of an FIR filter of the second embodiment of the present invention.

FIG. 3 is a block diagram showing configurations of a raised cosine filter of the second embodiment of the present invention. Basic configurations of the raised cosine filter of the second embodiment are the same as those in the first embodiment and differ from those in that a different method of setting a weighting coefficient of a FIR filter is employed.

The raised cosine filter of the second embodiment includes a shift register section (shift register 301) to perform a shifting operation on an inputted signal X(n) and to output the signal as time-series data (X(n), X(n−1), ..., X(n−m+2), X(n−m+1) each consisting of a plurality of signals containing past inputted signals, a shift register (shift register 302) to receive a gain control signal β(n) and to perform a shifting operation thereon and to output the signal as time-series data β(n−1), ..., β(n−m+2), β(n−m+1) each consisting of a plurality of signals containing past gain control signals, a plurality of first multipliers (multipliers 307, 308, 309, and 310) to multiply a plurality of signals outputted from the shift register 302 by a plurality of specified coefficients (T0, T1, ..., Tm−2, Tm−1) and to output the products as a plurality of weighting coefficients Z0(n), Z1(n), ..., Zm−2(n), Zm−1(n)), a plurality of second multipliers (303, 304, 305, and 306) to receive a plurality of signals and a plurality of weighting coefficients in synchronization with one another and to do multiplication thereon, and an adder 311 to perform an adding operation on a plurality of the second multipliers outputs.

The register 301 receives an inputted signal X(n) and outputs m-pieces of outputs X(n), X(n−1), ..., X(n−m+2), X(n−m+1). The signal X(n) is the same value as the inputted signal, X(n−1) is an inputted signal existed one clock before, in the same manner thereafter and then, the signal X(n−m+2) is an inputted signal existed (m−2) clocks before, and the signal X(n−m+1) is an inputted signal existed (m−1) clocks before. All these signals are one-bit time-series data. The shift register 301 makes up a shift register means to perform a shifting operation on inputted signals and to fetch present and past inputted signals.

In FIG. 3, each of the multipliers 303, 304, 305, and 306 is paired with each of the multipliers 307, 308, 309, and 310 and only four sets of pairs are shown, however, m-sets of multipliers may be provided in a manner to correspond to m-pieces of outputs from the shift register 301.

The register 302 receives a weighting coefficient setting signal β(n) and outputs m-pieces of outputs, that is, β(n), β(n−1), ..., β(n−m+2), β(n−m+1). The signal β(n) is the same value as the inputted signal, β(n−1) is an inputted signal existed one clock before and in the same manner thereafter and the signal β(n−m+2) is an inputted signal existed (m−2) clocks before, and the signal β(n−m+1) is an inputted signal existed (m−1) clocks before. All these signals are one-bit time-series data. The shift register 302 makes up a shift register means to perform a shifting operation on inputted signals and to fetch present and past inputted signals. Static weighting coefficients T0, T1, ..., Tm−2, and Tm−1 to determine a static filter basic characteristic of the FIR filter are internally stored therein. Each of these signals is made up of a plurality of bits.

The multiplier 307 receives time-series output β(n) consisting of a plurality of bits from the shift register 302 and the static weighting coefficient T0 internally stored in the filter and outputs a weighting coefficient Z0(n) being time-series data consisting of a plurality of bits to the multiplier 303. Similarly, each of the multipliers 308, 309, and 310 receives time-series output β(n−1), β(n−m+2), and β(n−m+2) each consisting of a plurality of bits from the shift register 302 and the static weighting coefficient T1, Tm−2, Tm−1 stored internally and outputs weighting coefficients Z1(n), Zm−2(n), Zm−1(n) each being time-series data consisting of a plurality of bits to the multipliers 304, 305 and 306, respectively.

The register 302 and multipliers 307 to 310 make up a weighting coefficient generating means to generate a weighting coefficient of the FIR filter according to a weighting coefficient setting signal being a gain control signal.

The multiplier 303 receives output X(n) from the shift register 301 and output Z0(n) from the multiplier 307 and multiplies these outputs and outputs results from multiplication each being time-series data consisting of a plurality of bits. Similarly, each of the multipliers 304, 305, and 306 receives output X(n−1), X(n−m+2), X(n−m+1) from the shift register 301 and output weighting coefficient Z1(n), Zm−2(n), Zm−1(n) from the multipliers 308, 309 and 310 and multiplies these outputs and outputs results from multiplication each being time-series data consisting of a plurality of bits.

The adder 311 receives outputs from all the multipliers including the multipliers 303, 304, 305, and 306 having the same functions as each other and performs an adding operation on the received outputs. As a result, the adder 311 outputs a filter output Y(n) being time-series data consisting of a plurality of bits.

Operations of the FIR filter so configured as above are explained by referring to FIG. 3 below.

When the inputted signal X(n) being one-bit time-series data is inputted to the shift register 301 at the (m−1) stage, m-pieces of one-bit time-series data outputs X(n), X(n−1), ..., X(n−m+2), X(n−m+1) are outputted from the shift register 301. The signal X(n) is the same value as the inputted signal, X(n−1) is an inputted signal existed one clock before, in the same manner thereafter and the signal X(n−m+2) is an inputted signal existed (m−2) clocks before, and the signal X(n−m+1) is an inputted signal existed (m−1) clocks before.

When a weighting coefficient setting signal β(n−1) being time-series data consisting of a plurality of bits is inputted to the shift register 302 at the (m−1) stage, m-pieces of outputs β(n), β(n−1), ..., β(n−m+2), β(n−m+1) being time-series data consisting of a plurality of bits are outputted from the shift register 302. The signal β(n) is the same value as the inputted signal, β(n−1) is an inputted signal existed one clock before, in the same manner thereafter, and then the signal β(n−m+2) is an inputted signal existed (m−2) clocks before, and the signal β(n−m+1) is an inputted signal existed (m−1) clocks before.

Each of the outputs X(n), X(n−1), ..., X(n−m+2), X(n−m+1) from the shift register 301 are inputted to each of the multipliers 303, 304, 305 and 306.

The output β(n) from the shift register 302 is inputted to the multiplier 307 and multiplied by the static weighting coefficient T0 and outputted as the weighting coefficient Z0(n) to the multiplier 303. Similarly, each of the outputs β(n−1), ..., β(n−m+2), β(n−m+1) is inputted to each of multipliers 308, 309, and 310 and is multiplied by the static weighting coefficients T1, Tm−2, Tm−1 and outputted as the weighting coefficients Z1(n), Zm−2(n), and Zm−1(n) to the multiplier 304, 305 and 306. Here, the weighting coefficient Zk(n) is given as the following equation (28). Hereinafter, k=0, 1, ..., m−2, m−1.

$$Zk(n)=Tk \cdot \beta(n-k) \tag{28}$$

By configuring the multipliers 307, 308, 309 and 310 so that these multipliers do multiplication computation only when an inputted value is changed, an amount of computation can be reduced. In the W-CDMA communication method in particular, since a change of a gain factor occurs at intervals of at least 256 chips or more, the amount of computation can be reduced to a sufficiently negligible amount when compared with the amount of computation in the raised cosine filter operating at a frequency obtained by multiplying a chip-rate frequency by an oversampling ratio.

The weighting coefficient Z0($n$) is inputted to the multiplier 303 and is multiplied by the output X(n) from the shift register 301 and the multiplying result Z0($n$)·X(n) is inputted to the adder 311. Similarly, each of the weighting coefficients Z1($n$), Zm−2($n$), Zm−1($n$) is inputted to each of the multipliers 304, 305 and 306 and is multiplied by the outputs X(n−1), X(n−m+2), X(n−m+1) and each of the multiplying results Z1($n$)·X(n−1), Zm−2(n)·X(n−m+2), Zm−1(n)·X(n−m+1) is inputted to the adder 311.

These results are added in the adder 311 and the filter output Y(n) is generated. The filter output Y(n) is shown by the following equation (29).

$$Y(n)=Z0(n)\cdot X(n)+Z1(n)\cdot X(n-1)+\ldots+Zm-2(n)\cdot X(n-m+2)+Zm-1(n)\cdot X(n-m+1)=T0\beta(n)\cdot X(n)+T1\beta(n-1)\cdot X(n-1)+\ldots+Tm-2\cdot\beta(n-m+2)\cdot X(n-m+2)+Tm-1\cdot\beta(n-m+1)\cdot X(n-m+1) \quad (29)$$

This equation is the same as the equation (23) showing a filter output from the FIR filter shown in FIG. 2. Therefore, it is to be noted that the FIR filter shown in FIG. 3 has the same function as the FIR filter in FIG. 2 has.

When the FIR filter of the second embodiment is used in the modulator shown in FIG. 1, the weighting coefficient setting signal β(n) is a data channel gain factor signal βd(n) generated by the data channel gain factor signal generator 106 and a control channel gain factor signal βc(n) generated by the control channel gain factor signal generator 107 and, therefore, one thing to be desired is that the weighting coefficients 108 and 109 can output these values. As a result, when the FIR filter of the second embodiment is used, the processing of multiplication by the static weighting coefficient and of setting different weighting coefficients to individual registers, which is required when the FIR filter of the first embodiment shown in FIG. 2 is employed in the weighting coefficient setting signal generators 108 and 109, is not required, which enables the modulator to be made small in size, low in costs, power consumption, and heat generation.

Thus, according to the second embodiment, since the static weighting coefficient is internally stored in the FIR filter, simply by inputting a data channel gain factor signal and a controlled data channel gain factor, a weighting coefficient can be automatically generated and, therefore, the processing of multiplication by a static weighting coefficient in the weighting coefficient setting signal generator and of setting different weighting coefficients to individual registers is not required, thus providing effects of enabling the modulator to be made small in size, costs, power consumption, and heat generation.

Third Embodiment

Figure 4:
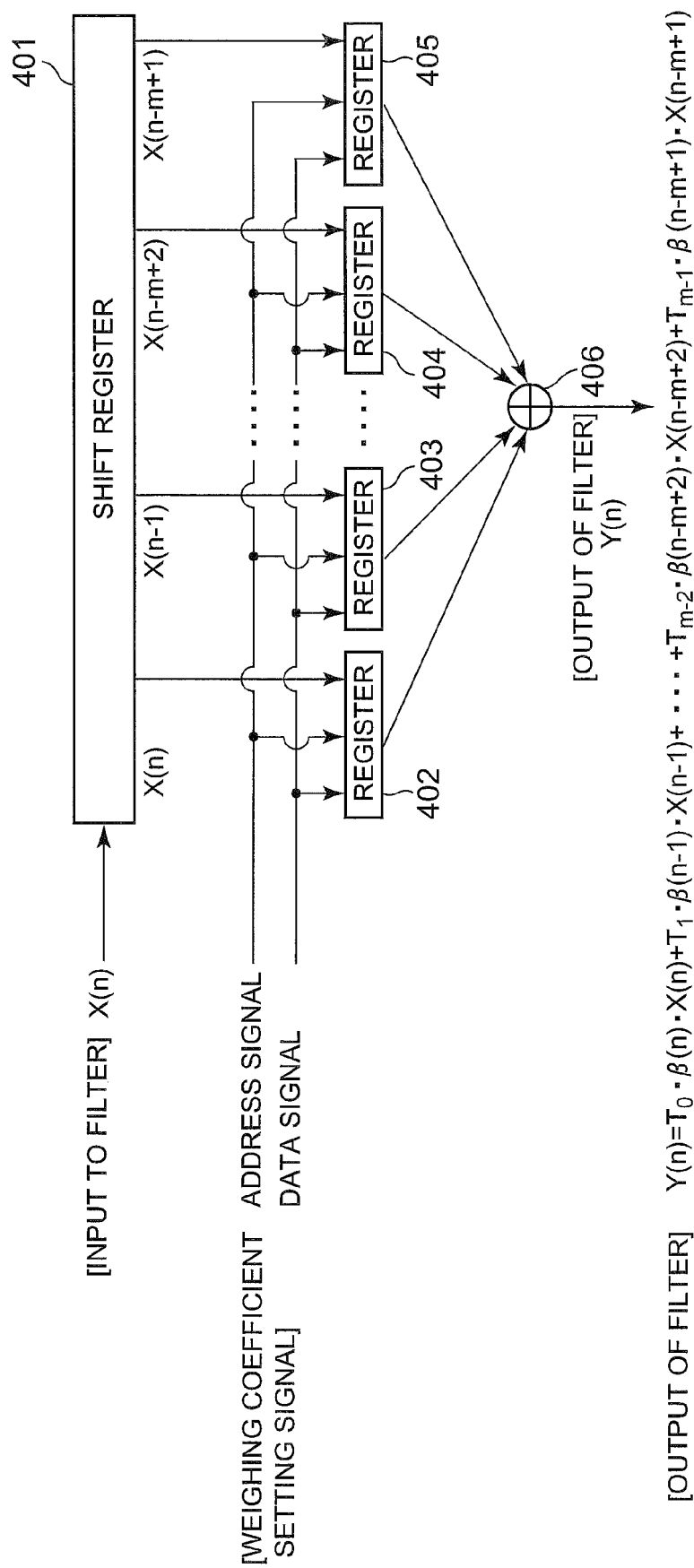
FIG. 4 is a block diagram showing configurations of an FIR filter of the third embodiment of the present invention.

FIG. 4 is a block diagram showing configurations of a raised cosine filter of the third embodiment of the present invention. Basic configurations of the raised cosine filter of the third embodiment are the same as those in the first embodiment and differ from those in that another different method of setting a weighting coefficient of the FIR filter is employed.

The raised cosine filter of the third embodiment includes a shift register section (shift register 401) to perform a shifting operation on an inputted signal X(n) and to output the signal as time-series data (X(n), X(n−1), ..., X(n−m+2), X(n−m+1) each consisting of a plurality of signals containing past inputted signals, a plurality of register sections (shift registers 402, 403, 404, and 405) to receive and store the first and second weighting coefficients according to a gain control signal and to switch the first and second weighting coefficients for outputting according to a plurality of signals output from the shift register section, and an adder 406 to perform adding operation on outputs of a plurality of the register sections.

The shift register 401 receives an inputted signal X(n) and outputs m-pieces of outputs X(n), X(n−1), ..., X(n−m+2), X(n−m+1). The signal X(n) is the same value as the inputted signal, X(n−1) is an inputted signal existed one clock before, in the same manner thereafter, and the signal X(n−m+2) is an inputted signal existed (m−2) clocks before, and the signal X(n−m+1) is an inputted signal existed (m−1) clocks before. The shift register 401 is a shift register means to perform a shifting operation on an inputted signal and fetches present and past inputted signals.

Moreover, in FIG. 4, only four registers 402, 403, 404 and 405 are shown, however, m-pieces of registers may be provided in a manner to correspond to m-pieces of outputs from the shift register 401.

The register 402 receives address signal and data signal both being a weighting coefficient setting signal, output X(n) from the shift register 401 and outputs its stored data to the adder 406. Similarly, each of the registers 403, 404 and 405 receives address signal and data signal both being a weighting coefficient setting signal, output X(n−1), ..., X(n−m+2), X(n−m+1) from the shift register 401 and outputs their stored data to the adder 406. Stored data of each of the registers 402, 403, 404, and 405 is data consisting of a plurality of bits. The registers 402, 403, 404 and 405 make up a register means to store a weighting coefficient of the FIR filter according to a weighting coefficient setting signal being a gain control signal and to switch an output by a signal from the shift register means.

The adder 406 receives outputs from all the registers including the registers 402, 403, 404 and 405 and performs an adding operation on the received outputs. As a result, the adder 406 outputs a filter output Y(n) being time-series data consisting of a plurality of bits.

Operations of the FIR filter so configured as above are described below.

When the input signal X(n) being one-bit time-series data is inputted to the shift register 401 with (m−1) stages, m-pieces of one-bit time-series data outputs X(n), X(n−1), ..., X(n−m+2), X(n−m+1) are outputted from the shift register 401. Here, the signal X(n) is the same value as the input signal, the signal X(n−1) is an inputted signal existed one clock before, in the same manner thereafter, and the signal X(n−m+2) is an inputted signal existed (m−2) clocks before, and the signal X(n−m+1) is an inputted signal existed (m−1) clocks before.

The weighting coefficient setting signal is made up of an address signal and data signal and weighting coefficient information is stored via a data signal in the register specified by an address signal.

In the register 402, binary values of T0·β(n) and −T0·β(n) are stored at the time "n" by a weighting coefficient setting signal. At this point of time, the value X(n) has been already inputted in the register 402. Here, the X(n) is one-bit time-series data taking a value of 1 or −1. The register 402 has a function of switching an output so that, when the X(n) is 1, the value T0·β(n) is outputted and, when the X(n) is −1, the value −T0·β(n). As a result, the output from the register 402 is equivalent to the outputting of T0·β(n)·X(n). Similarly, in the registers 403, 404 and 405 are respectively and stored ±T1·β(n−1), Tm−2·β(n−m+2), and ±Tm−1·β(n−m+1) by the weighting coefficient setting signal. Then, according to the values X(n−1), X(n−m+2), and X(n−m+1), values being equal to T1·β(n−1)·X(n−1), Tm−2·β(n−m+2)·X(n−m+2), and Tm−1·β(n−m+1)·X(n−m+1) are output respectively.

The outputs from registers 402, 403, 404 and 405 are inputed to the adder 406 and added therein to generate a filter output Y(n). The filter output Y(n) is shown by the following equation (30).

$$Y(n)=T0\cdot\beta(n)\cdot X(n)+T1\cdot\beta(n-1)\cdot X(n-1)+\ldots+Tm-2\cdot\beta(n-m+2)\cdot X(n-m+2)+Tm-1\cdot\beta(n-m+1)\cdot X(n-m+1) \quad (30)$$

The above equation (30) is the same as the equation (23) showing the filter output of the FIR filter in FIG. 2. Therefore, it is understood that the FIR filter shown in FIG. 4 has the same function as the FIR filter in FIG. 2 and FIG. 3 has.

When the FIR filter of the third embodiment is used in the modulator shown in FIG. 1, the weighting coefficient setting signal generators 108 and 109 perform functions of generating a weighting coefficient setting signal consisting of an address signal and data signal and of setting the above value to each register.

The FIR filter of the third embodiment is featured by no use of multipliers. The multiplier, since it is so configured as to multiply signals by weighting coefficients, unless being controlled with inputted information being monitored all the time, has to continue operating all the time. On the other hand, in the filter of the third embodiment, unless a register value is changed, only reading values from registers is performed. As a result, not only power consumption but also heat generation can be reduced.

As a similar alternative, a method is available by which a plurality of data pairs is stored in each register.

In the example described above, a pair of positive and negative values is stored in each register. However, by storing all pairs of values and specifying one set of pairs of values to be outputted according to a data signal of a weighting coefficient setting signal, the number of weighting coefficient setting signals can be reduced, which enables the reduction of loads to the weighting coefficient setting signal generators 108 and 109 in FIG. 1.

It is here supposed that a value to be stored in a register is made up of 20 bits, or a pair of 10 bits. If predicted pairs of values are 16 possible pairs, these values can be specified by data signal of 4 bits and, therefore, when compared with the case where values are transmitted by a data signal of 20 bits, an amount of information can be reduced by 20%. In this case, the weighting coefficient setting signal generators 108 and 109 output specified information of a pair of values by the data signal of the weighting coefficient setting signal.

Thus, according to the third embodiment, in the process of multiplying inputted signals of the FIR filter with weighting coefficients, by employing, instead of a multiplier, a register and by switching the register in accordance with inputted signals, low power consumption and low heat generation can be achieved.

Fourth Embodiment

Figure 5:
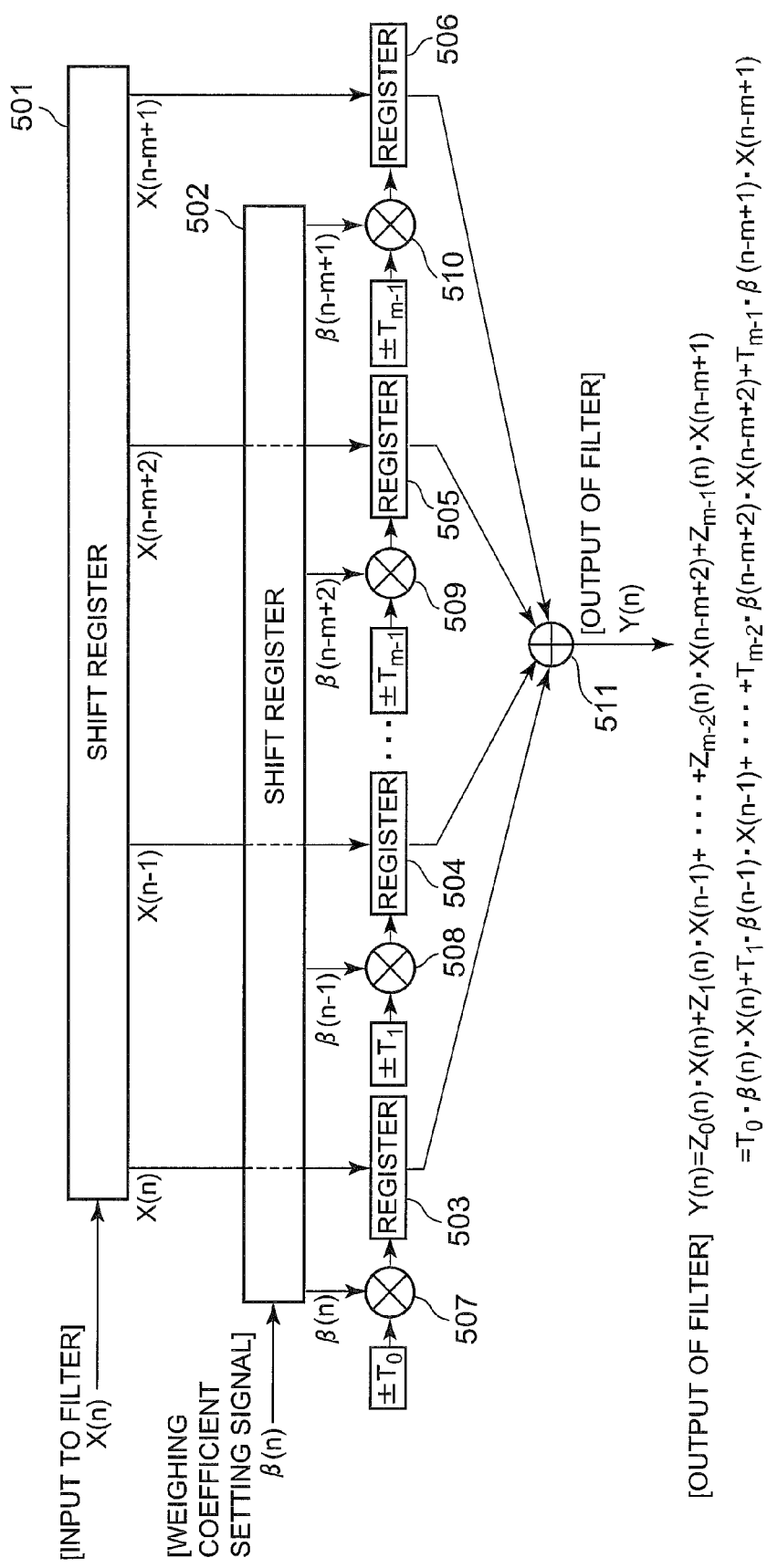
FIG. 5 is a block diagram showing configurations of an FIR filter of the fourth embodiment of the present invention.

FIG. 5 is a block diagram showing configurations of a raised cosine filter of the fourth embodiment of the present invention. Basic configurations of the raised cosine filter of the fourth embodiment are the same as those in the first embodiment and differ from those in that another different method of setting a weighting coefficient of the FIR filter is employed.

The raised cosine filter of the fourth embodiment includes a shift register section (shift register 501) to perform shifting processing on inputted data X(n) and to output time-series data X(n), X(n-1), ..., X(n-m+2), X(n-m+1) each consisting of a plurality of signals containing past inputted signals, a shift register 502 to receive a gain control signal $\beta(n)$ and to perform shifting processing thereon and output time-series data $\beta(n), \beta(n-1), \ldots, \beta(n-m+2), \beta(n-m+1)$ each consisting of a plurality of signals containing past gain control signals, a plurality of multipliers (multipliers 507, 508, 509 and 510) to multiply a plurality of signals output from the shift register 502 by a plurality of specified first and second coefficients ($\pm T0, \pm T1, \ldots, \pm Tm-2, \pm Tm-1$) and to output a plurality of first and second weighting coefficients, a plurality of register sections (registers 503, 504, 505 and 506) to receive and store a plurality of first and second weighting coefficients output from a plurality of multipliers and to switch each of the first and second weighting coefficients according to a plurality of signals output from the shift register section for outputting, and an adder 511 to add outputs from a plurality of register sections.

The shift register 501 receives an inputted signal X(n) and outputs m-pieces of outputs X(n), X(n-1), ..., X(n-m+2), X(n-m+1). The signal X(n) is the same value as the inputted signal, X(n-1) is an inputted signal existed one clock before, in the same manner thereafter, and the signal X(n-m+2) is an inputted signal existed (m-2) clocks before, and the signal X(n-m+1) is an inputted signal existed (m-1) clocks before. All these signals is one-bit time-series data. The shift register 501 makes up a shift register means to perform shifting processing on inputted signals and fetches present and past inputted signals.

In FIG. 5, only four registers 503, 504, 505 and 506 and only four multipliers 507, 508, 509 and 510 are shown, however, m-pieces of registers and multipliers may be provided in a manner to correspond to m-pieces of outputs from the shift register 501.

The shift register 502 receives a weighting coefficient setting signal $\beta(n)$ and outputs m-pieces of outputs, that is, $\beta(n), \beta(n-1), \ldots, \beta(n-m+2), \beta(n-m+1)$. The signal $\beta(n)$ is the same value as the input signal, the signal $\beta(n-1)$ is an inputted signal existed one clock before, in the same manner thereafter, and the signal $\beta(n-m+2)$ is an inputted signal existed (m-2) clocks before, and the signal $\beta(n-m+1)$ is an inputted signal existed (m-1) clocks before. All these signals are time-series data consisting of a plurality of bits. The shift register 502 makes up a shift register means to perform shifting processing and to fetch present and past inputted signals.

M-pairs of static weighting coefficients ($\pm T0, \pm T1, \ldots, \pm Tm-2, \pm Tm-1$) each being made up of a pair of positive and negative values which determines a static filter basic characteristic of the FIR filter are internally stored therein. These are data having a plurality of bits.

The multiplier 507 receives the output $\beta(n)$ from the shift register 502 being time-series data consisting of a plurality of bits and a pair of positive and negative static weighting coefficients $\pm T0$ internally stored in the filter and outputs a pair of positive and negative static weighting coefficients $\pm Z0(n)$ being time-series data consisting of a plurality of bits to the register 503. Similarly, the multipliers 508, 509, and 510 receive the outputs $\beta(n-1), \beta(n-m+2), \beta(n-m+1)$ from the shift register 502 each being time-series data consisting of a plurality of bits and a pair of positive and negative static weighting coefficients $\pm T1, \pm Tm-2, \pm Tm-1$ internally stored and outputs a pair of positive and negative static weighting coefficients $\pm Z1(n), \pm Zm-2(n), \pm Zm-1(n)$ to the registers 504, 505 and 506.

The shift register 502 and multipliers 507 to 510 make up a weighting coefficient generating means to generate a weighting coefficient of the FIR filter in accordance with a weighting coefficient setting signal being a gain control signal.

The register 503 receives the outputs ±Z0(n) from the multiplier 507 to store them. The register 503 receives the output X(n) from the shift register 501 and outputs either of the binary values ±Z0(n) being stored to correspond to the output X(n). Similarly, each of the registers 504, 505, and 506 receives each of the weighting coefficients ±Z1(n), ±Zm−2(n), ±Zm−1(n) each being an output from each of the multipliers 508, 509 and 510 and stores them. Also, each of the registers receives the outputs X(n−1), . . . , X(n−m+2), X(n−m+1) from the shift register 501 and outputs any one of the binary values ±Z1(n), ±Zm−2(n), ±Zm−1(n) each being stored to correspond to the above outputs. Each of the registers 503 to 506 makes up a register means to store weighting coefficients of the FIR filter and switch outputs by an inputted signal from the shift register means.

The adder 511 receives outputs from all the registers including the registers 503, 504, 505 and 506 having the same functions as each other and performs an adding operation on the received outputs. As a result, the adder 511 outputs a filter output Y(n) being time-series data consisting of a plurality of bits.

Operations of the FIR filter so configured as above are described below.

When the input signal X(n) being one-bit time-series data is inputted to the shift register 501 with (m−1) stages, m-pieces of one-bit time-series data X(n), X(n−1), . . . , X(n−m+2), X(n−m+1) are outputted from the shift register 501 as outputs. Here, the signal X(n) is the same value as the input signal, the signal X(n−1) is an inputted signal existed one clock before, in the same manner thereafter, and the signal X(n−m+2) is an inputted signal existed (m−2) clocks before, and the signal X(n−m+1) is an inputted signal existed (m−1) clocks before.

When the weighting coefficient setting signal β(n) being time-series data consisting of a plurality of bits is inputted to the shift register 502 at the (m−1) stage, m-pieces of outputs β(n), β(n−1), . . . , β(n−m+2), β(n−m+1) each being time-series data consisting of a plurality of bits are outputted from the shift register 502. The signal β(n) is the same value as the inputted signal, β(n−1) is an inputted signal existed one clock before, in the same manner thereafter, and the signal β(n−m+2) is an inputted signal existed (m−2) clocks before, and the signal β(n−m+1) is an inputted signal existed (m−1) clocks before.

The outputs X(n), X(n−1), . . . , X(n−m+2), X(n−m+1) from the shift register 501 are inputted respectively to registers 503, 504, 505 and 506.

The output β(n) from the register 502 is inputted to the multiplier 507 and is multiplied by a pair of positive and negative static weighting coefficients ±T0 and are outputted as a weighting coefficient ±Z0(n) to the register 503. Similarly, the outputs β(n−1), . . . , β(n−m+2), β(n−m+1) from the shift register 502 are inputted respectively to multipliers 508, 509 and 510 and are multiplied by a pair of positive and negative weighting coefficients ±T1, ±Tm−2, Tm−1 and are outputted as weighting coefficients ±Z1(n), ±Zm−2(n), ±Zm−1(n) to the registers 504, 505 and 506. Here, the weighting coefficient Zk(n) is given by the following equation (31). It is supposed that k=0, 1, . . . , m−2, and m−1.

$$Zk(n)=Tk \cdot \beta(n-k) \tag{31}$$

By configuring the multipliers 507, 508, 509 and 510 so as to do multiplication only when an inputted value is changed, an amount of computation can be reduced. In the W-CDMA method in particular, since a change of a gain factor occurs at intervals of at least 256 chips or more, the amount of computation can be reduced to a sufficiently negligible amount when compared with the amount of computation in the raised cosine filter operating at a frequency obtained by multiplying a chip-rate frequency by an oversampling ratio. The outputting (change of register storing value) to the registers 503 to 506 are performed only when multiplication is done.

At the time "n", the register 503 receives binary values of weighting coefficient ±Z0(n) from the multiplier 507 to store the values. At this time point, the X(n) has been input to the register 503. Here, the X(n) is one-bit time-series data and takes 1 or −1. The register 503 has a function of switching so that, when the X(n) is 1, the Z0(n) is output and, when the X(n) is −1, −Z0(n) is output. As a result, the output from the register 503 is equivalent to the outputting of Z0(n)·X(n).

Similarly, the registers 504, 505 and 506 receives respectively weighting coefficients ±Z1(n), ±Zm−2(n) and ±Zm−1(n) from the multipliers 508, 509 and 510 to store the coefficients and then outputs values equal to Z1(n)·X(n−1), Zm−2(n)·X(n−m+2), Zm−1(n)·X(n−m+1) according to the values X(n−1), . . . , X(n−m+2), X(n−m+1).

The outputs from the registers 503, 504 and 505 are inputted to the adder 511 and added therein to generate the filter output Y(n). The filter output Y(n) is shown by the following equation.

$$\begin{aligned} Y(n) &= Z0(n) \cdot X(n) + Z1(n) \cdot X(n-1) + \ldots + Zm - \\ & \quad 2(n) \cdot X(n-m+2) + Zm - 1(n) \cdot X(n-m+1) = \\ & \quad T0 \cdot \beta(n) \cdot X(n) + T1 \cdot \beta(n-1) \cdot X(n-1) + \ldots + \\ & \quad Tm - 2 \cdot \beta(n-m+2) \cdot X(n-m+2) + \\ & \quad Tm - 1 \cdot \beta(n-m+1) \cdot X(n-m+1) \end{aligned} \tag{32}$$

The equation (32) is the same as the equation (23) showing the filter output of the FIR filter in FIG. 2. Therefore, it is understood that the FIR filter in FIG. 5 has the same function as the FIR filter shown in FIG. 2 to FIG. 4.

When the FIR filter of the fourth embodiment is used in the modulator shown in FIG. 1, the weighting coefficient setting signal β(n) is a data channel gain factor signal βd(n) generated by the data channel gain factor signal generator 106 and a control channel gain factor signal βc(n) generated by the control channel gain factor signal generator 107 and, therefore, one thing to be desired is that the weighting coefficients 108 and 109 can output these values. Therefore, when the FIR filter of the fourth embodiment is used, the processing which is required when the FIR filter of the first embodiment shown in FIG. 2 is employed is not required in the weighting coefficient setting signal generators 108 and 109. That is, the processing of multiplication by static weighting coefficients and of setting different weighting coefficients to individual registers is not required. This enables further miniaturization, low costs, low power consumption, and low heat generation.

Also, another feature of the FIR filter of the fourth embodiment is that, in the process of multiplying inputted signals by the weighting coefficient, the multiplier is not used. The multiplier, since it is configured to multiply signals by weighting coefficients, unless being controlled with input information being monitored all the time, has to continue operating all the time. On the other hand, in the filter of the fourth embodiment, unless a register value is changed, only reading values from registers is performed. As a result, not only power consumption but also heat generation can be reduced.

Thus, according to the fourth embodiment, since the static weighting coefficient is internally stored in the FIR filter, simply by inputting a data channel gain factor signal and a controlled data channel gain factor, a weighting coefficient can be automatically generated and, therefore, the processing of multiplication by a static weighting coefficient in the weighting coefficient setting signal generator and of setting different weighting coefficients to individual registers is not required, thus providing effects of enabling the modulator to be made small in size, low in costs, power consumption, and heat generation.

Further, in the process of multiplying inputted signals of the FIR filter with weighting coefficients, by employing, instead of a multiplier, a register and by switching the register in accordance with inputted signals, low power consumption and low heat generation can be achieved.

Fifth Embodiment

Figure 6:
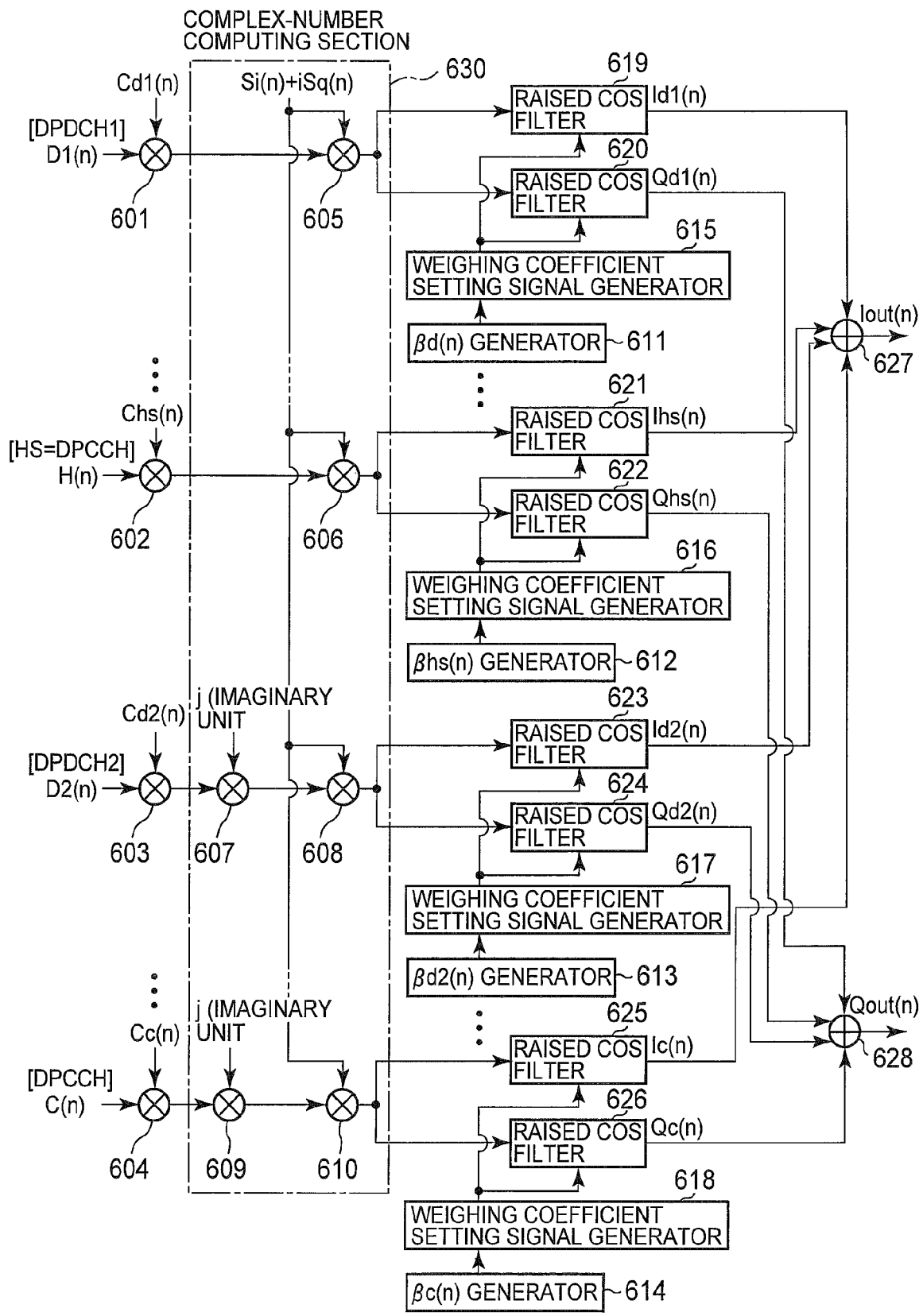
FIG. 6 is a block diagram showing configurations of a modulator of the fifth embodiment of the present invention.

FIG. 6 is a block diagram showing configurations of a modulator of the fifth embodiment of the present invention. The modulator of the fifth embodiment differs from each described above in that inputs of 3 channels or more (4 channels are shown in FIG. 6) are provided.

The modulator of the fifth embodiment differs from that of the first embodiment in that sets of the components, that is, multipliers to perform multiplication on a channelization code, complex-number multipliers to perform multiplication on a scramble code, channel gain factor generators, weighting coefficient setting signal generators, in-phase component raised cosine filters, orthogonal component raised cosine filters are increased by additional channel and outputs from these increased components are added in the adders 627 and 628.

That is, configurations of the modulator corresponding to the transmitting data DPDCH1 include the multiplier 601, complex-number multiplier 605, data channel gain factor signal generator 611 (in FIG. 6, shown as the "βd(n)" generator), weighting coefficient setting signal generator 615, raised cosine filter 619 (in FIG. 6, all shown as the "raised COS filter"), and raised cosine filter 620.

Configurations of the modulator corresponding to the transmitting data HS-DPCCH include the multiplier 602, complex-number multiplier 606, control channel gain factor signal generator 612 (in FIG. 6, shown as the "βhs(n) generator"), weighting coefficient setting signal generator 616, raised cosine filter 621, and raised cosine filter 622.

Configurations of the modulator corresponding to the transmitting data DPDCH2 include the multiplier 603, complex-number multiplier 607, complex-number multiplier 608, data channel gain factor signal generator 613 (in FIG. 6, shown as the "βd2(n) generator"), weighting coefficient setting signal generator 617, raised cosine filter 623, and raised cosine filter 624.

Configurations of the modulator corresponding to the transmitting data DPCCH include the multiplier 604, complex-number multiplier 609, complex-number multiplier 610, control channel gain factor signal generator 614 (in FIG. 6, shown as the "βc(n) generator"), weighting coefficient setting signal generator 618, raised cosine filter 625, and raised cosine filter 626. These component elements are the same as in the first embodiment and their detailed descriptions are omitted accordingly.

The adder 627 adds outputs from the raised cosine filter 619, raised cosine filter 621, raised cosine filter 623, and raised cosine filter 625 and outputs in-phase component output Iout(n). The adder 628 adds outputs from the raised cosine filter 620, raised cosine filter 622, raised cosine filter 624, and raised cosine filter 626 and outputs orthogonal component output Qout(n).

Thus, some preferred embodiments of the present invention have been described by referring to drawings, however, these are only examples and various configurations other than above may be employed.

For example, in each of the above embodiments, in a communication system using the W-CDMA communication method, the example of the raised cosine filter employed in the modulator to be used in an uplink is explained, however, the present invention is not limited to this and the modulator using QPSK (Quadrature Phase Shift Keying) or 16-QAM (16-ary Quadrature Amplitude Modulation) to be used in a downlink according not only to the W-CDMA communication method but also to the general CDMA communication method can be included in the present invention.

INDUSTRIAL APPLICABILITY

The present invention is an improvement of the HPSK modulator to be used at a time of communication through an uplink from a mobile station to a base station. The present invention provides the modulator being made small in size, low in costs, power consumption, heat generation, and made less in spurious signals, the filter included in the modulator, the gain control method employed in the filter, and the code modulating method, which provide excellent effects in the communication system using the W-CDMA method.

The invention claimed is:

1. A modulator comprising:
    a code modulating unit to receive transmitted data to perform code modulation on the data and to output a code-modulated data signal;
    a gain control signal generating unit to generate a gain control signal; and
    a filter unit to receive said code-modulated data signal from said code modulating unit to perform bandwidth limitation on the received code-modulated data signal and to output a bandwidth-limited signal,
    wherein said filter unit comprises:
        a time-series data generating unit to output time-series data having a plurality of signals containing past inputted signals, and to perform shifting processing;
        a coefficient setting unit to set a plurality of filter weighting coefficients in accordance with the value of the gain control signal received from the gain control signal generating unit, setting of the filter weighting coefficients associated with the shifting processing of each of the plurality of signals of the time-series data outputted by said time-series data generating unit; and
        a gain control unit to control a gain according to the plurality of filter weighting coefficients set by said coefficient setting unit,
    wherein said filter unit further comprises:
        a shift register section to perform shifting processing on an inputted signal and to output the time-series data made up of the plurality of signals containing past inputted signals;
        a shift register to receive the gain control signal from said gain control signal generating unit to perform shifting processing on the received gain control signal and to output a time-series gain control data consisting of a plurality of signals containing past gain control signals;
        a plurality of multipliers to multiply each of the plurality of signals outputted from said shift register by each of a plurality of specified first and second coefficients and to output a plurality of first and second weighting coefficients;

a plurality of register sections to receive the first and second weighting coefficients outputted from said plurality of multipliers to store the first and second weighting coefficients to switch one of the first and second weighting coefficients in accordance with the plurality of signals outputted from said shift register section and to output the filter weighting coefficients; and an adder to add outputs from said plurality of register sections.

2. The modulator according to claim 1, wherein said filter unit comprises an FIR (Finite Impulse Response) filter.

3. The modulator according to claim 1, wherein an input signal of said filter section is one-bit data.

4. A modulator comprising:
a first code modulating unit to receive first transmitted data to perform code modulation on the first transmitted data to output a first code-modulated output;
a second code modulating unit to receive second transmitted data to perform code modulation on the second transmitted data to output a second code-modulated output;
a first gain control signal generating unit to generate a first gain control signal;
a second gain control signal generating unit to generate a second gain control signal;
a first filter unit to receive said first code-modulated output from said first code modulating unit to perform bandwidth limitation on the received first code-modulated output and to output a first bandwidth-limited output;
a second filter unit to receive said second code-modulated output from said second code modulating unit to perform bandwidth limitation on the received second code-modulated output and to output a second bandwidth-limited output; and
an adder to receive the first and second bandwidth-limited outputs from said first and second filter units to synthesize the received first and second bandwidth-limited outputs and to output a synthesized output,
wherein said first filter unit comprises:
a first time-series data generating unit to output first time-series data having a first plurality of signals containing past inputted signals, and to perform first shifting processing;
a first coefficient setting unit to set a plurality of first filter weighting coefficients in accordance with the value of the first gain control signal received from the first gain control signal generating unit, setting of the first filter weighting coefficients associated with the first shifting processing of each of the first plurality of signals of the first time-series data outputted by said first time-series data generating unit; and
a first gain control unit to control a first gain according to the plurality of first filter weighting coefficients set by said first coefficient setting unit,
and wherein the second filter unit comprises:
a second time-series data generating unit to output second time-series data having a second plurality of signals containing past inputted signals, and to perform second shifting processing;
a second coefficient setting unit to set a plurality of second filter weighting coefficients in accordance with the value of the second gain control signal received from the second gain control signal generating unit, setting of the second filter weighting coefficients associated with the second shifting processing of each of the second plurality of signals of the second time-series data outputted by said second time-series data generating unit; and
a second gain control unit to control a second gain according to the plurality of second filter weighting coefficients set by said second coefficient setting unit,
wherein said first filter unit further comprises:
a shift register section to perform shifting processing on an inputted signal and to output the time-series data made up of the first plurality of signals containing past inputted signals;
a shift register to receive the first gain control signal from said gain control signal generating unit to perform shifting processing on the received first gain control signal and to output a time-series gain control data consisting of a plurality of signals containing past gain control signals;
a plurality of multipliers to multiply each of the plurality of signals outputted from said shift register by each of a plurality of specified first and second coefficients and to output a plurality of first and second weighting coefficients;
a plurality of register sections to receive the first and second weighting coefficients outputted from said plurality of multipliers to store the first and second weighting coefficients to switch one of the first and second weighting coefficients in accordance with the plurality of signals outputted from said shift register section and to output the first filter weighting coefficients; and
an adder to add outputs from said plurality of register sections.

5. The modulator according to claim 4, wherein said first and second filter units are mounted for every channel multiplexed through encoding.

6. A filter to perform bandwidth limitation on code-modulated signals and to output the code-modulated signals comprising:
a time-series data generating unit to output time-series data made up of a plurality of signals containing past inputted signals, and to perform shifting processing;
a coefficient setting unit to set a plurality of filter weighting coefficients in accordance with a gain control signal, setting of the filter weighting coefficients associated with the shifting processing of each of the plurality of signals of the time-series data outputted by said time-series data generating unit;
a gain control unit to control a gain according to the plurality of filter weighting coefficients set by said coefficient setting unit;
a shift register section to perform the shifting processing on an inputted signal and to output the time-series data made up of the plurality of signals containing past inputted signals;
a shift register to receive the gain control signal to perform shifting processing on the gain signal and to output a time-series gain control data made up of a plurality of signals containing past gain control signals;
a plurality of multipliers to multiply each of the plurality of signals outputted from said shift register by each of a plurality of specified first and second coefficients and to output a plurality of first and second weighting coefficients;
a plurality of register sections to receive and store the first and second weighting coefficients outputted from said plurality of multipliers and to switch the first and second weighting coefficients in accordance with the plurality of signals outputted from the shift register section; and an adder to add outputs from said plurality of register sections.

7. The filter according to claim 6, wherein said filter is an FIR filter.

8. The filter according to claim 6, wherein a signal inputted to said filter is one-bit data.

9. A filter gain control method for limiting a bandwidth of a code-modulated inputted signal comprising:

a step of outputting time-series data made up of a plurality of signals containing past inputted signals, and of performing shifting processing;

a step of setting a plurality of filter weighting coefficients according to a gain control signal, setting of the filter weighting coefficients associated with the shifting processing of each of the plurality of signals making up the time-series data outputted in the step of outputting the time-series data;

a step of controlling a gain according to the plurality of filter weighting coefficients;

a step of performing the shifting processing on an inputted signal and to output the time-series data made up of the plurality of signals containing past inputted signals;

a step of receiving the gain control signal to perform shifting processing on the gain control signal and to output a time-series gain control data made up of a plurality of signals containing past gain control signals;

a step of multiplying each of the plurality of signals making up the time-series gain control data by each of a plurality of specified first and second coefficients and outputting a plurality of first and second weighting coefficients;

a step of receiving and storing within a plurality of register sections the first and second weighting coefficients switching the first and second weighting coefficients in accordance with the plurality of signals making up the series data; and a step of adding outputs from said plurality of register sections.

10. The filter gain control method according to claim 9, wherein said filter is an FIR filter.

11. The filter gain control method according to claim 9, wherein the signal inputted to the filter is one-bit data.

12. A code modulating method comprising:

a step of receiving and code-modulating a transmitted data and generating the code-modulated data;

a step of generating a gain control signal; and a step of receiving the code-modulated data generated in the step of code-modulating and performing bandwidth-limitation to output a bandwidth-limited data, wherein the step of receiving the code-modulated data generated in the step of code-modulating and performing the bandwidth-limitation to output the bandwidth-limited data comprises:

a step of outputting time-series data made up of a plurality of signals containing past inputted signals, and of performing shifting processing;

a step of setting a plurality of filter weighting coefficients in accordance with the value of the gain control signal received from the gain control signal generating unit, setting of the filter weighting coefficients associated with the shifting processing of each of the plurality of signals making up the time-series data outputted in the step of outputting the time-series data; and a step of controlling a gain according to the plurality of filter weighting coefficients set in the step of setting the plurality of filter weighting coefficients;

wherein the step of receiving the code-modulated data generated in the step of code-modulating and performing the bandwidth-limitation to output the bandwidth-limited data further comprises:

a step of performing shifting processing on an inputted signal and to output the time-series data made up of the plurality of signals containing past inputted signals;

a step of receiving the gain control signal, performing shifting processing on the received gain control signal, and outputting a time-series gain control data consisting of a plurality of signals containing past gain control signals;

a step of multiplying each of the plurality of signals making up the time-series gain control data by each of a plurality of specified first and second coefficients and outputting a plurality of first and second weighting coefficients;

a step of receiving the first and second weighting coefficients, storing within a plurality of register sections the first and second weighting coefficients to switch one of the first and second weighting coefficients in accordance with the plurality of signals making up the series data, and outputting the filter weighting coefficients; and a step of adding outputs from said plurality of register sections.

13. The code modulating method according to claim 12, wherein the input signal is one-bit data.

* * * * *